US010799848B2

(12) United States Patent
Liu

(10) Patent No.: US 10,799,848 B2
(45) Date of Patent: Oct. 13, 2020

(54) REACTOR FOR HYDROTHERMAL GROWTH OF STRUCTURED MATERIALS

(71) Applicant: Molecule Works Inc., Richland, WA (US)

(72) Inventor: Wei Liu, Richland, WA (US)

(73) Assignee: Molecule Works Inc., Richland, WA (US)

(*) Notice: Subject to any disclaimer, the term of this patent is extended or adjusted under 35 U.S.C. 154(b) by 0 days.

(21) Appl. No.: 16/725,660

(22) Filed: Dec. 23, 2019

(65) Prior Publication Data
US 2020/0179900 A1 Jun. 11, 2020

Related U.S. Application Data

(62) Division of application No. 16/235,655, filed on Dec. 28, 2018, now Pat. No. 10,632,447.
(Continued)

(51) Int. Cl.
*B01J 19/24* (2006.01)
*B01J 3/04* (2006.01)
(Continued)

(52) U.S. Cl.
CPC ........ *B01J 19/247* (2013.01); *B01D 67/0051* (2013.01); *B01D 71/028* (2013.01); *B01J 3/04* (2013.01); *C01B 39/04* (2013.01); *B01D 69/10* (2013.01); *B01D 2323/08* (2013.01); *B01J 2219/00058* (2013.01); *B01J 2219/00081* (2013.01); *B01J 2219/00096* (2013.01);
(Continued)

(58) Field of Classification Search
CPC . B01J 19/247; B01J 19/249; B01J 3/04; B01J 2219/00058; B01J 2219/00081; B01J 2219/1943; B01J 2219/2486; B01J 2219/00096; B01J 2219/00162; C01B 39/04; B01D 71/028; B01D 67/0051; B01D 2323/08
See application file for complete search history.

(56) References Cited

U.S. PATENT DOCUMENTS 3,651,183 A    3/1972 Hosoda et al.
5,262,130 A    11/1993 Kissel et al.
(Continued)

OTHER PUBLICATIONS

Auerbach, et al., "Handbook of Zeolite Science and Technology", Copyright 2003 Marcel Dekker, Inc., 1170 pages, (2003).
(Continued)

*Primary Examiner* — Lessanework Seifu
(74) *Attorney, Agent, or Firm* — The Marbury Law Group, PLLC

(57) ABSTRACT

Design, fabrication, and usage of a reactor are presented for synthesis of structured materials from a liquid-phase precursor by heating. The structured materials are particles, membranes or films of micro-porous molecular sieve crystals such as zeolite and meso-porous materials. The precursor solution and structured materials in the reactor are uniformly heated by a planar heater with characteristic heat transfer dimension in the range of 3 mm to 10 cm. A planar heater having width and length at least three times of the characteristic heat transfer dimension provides at least one surface of uniform temperature distribution for heating purposes. Heating is conducted over a temperature range of 20 to 300° C. The planar heater can be heated by electrical power of by thermal fluid.

10 Claims, 18 Drawing Sheets

Related U.S. Application Data

(60) Provisional application No. 62/723,845, filed on Aug. 28, 2018.

(51) Int. Cl.
  *B01D 67/00*  (2006.01)
  *B01D 71/02*  (2006.01)
  *C01B 39/04*  (2006.01)
  *B01D 69/10*  (2006.01)

(52) U.S. Cl.
  CPC .............. *B01J 2219/00162* (2013.01); *B01J 2219/1943* (2013.01); *B01J 2219/2486* (2013.01)

(56) References Cited

U.S. PATENT DOCUMENTS

| | | |
|---|---|---|
| 5,874,014 A | 2/1999 | Robson et al. |
| 6,402,836 B1 | 6/2002 | Leycuras |
| 2015/0265975 A1 | 9/2015 | Liu et al. |

OTHER PUBLICATIONS

Liu, et al., "Continuous flow synthesis of ZSM-5 zeolite on the order of seconds", www.pnas.org/cgi/doi/10.1073/pnas.1615872113, PNAS, vol. 113, No. 50, pp. 14267-14271, (Dec. 13, 2016).

Conner, et al., "Microwave Synthesis of Zeolites: 1. Reactor Engineering", J. Phys. Chem. B 2004, 108, pp. 13913-13920, (2004).

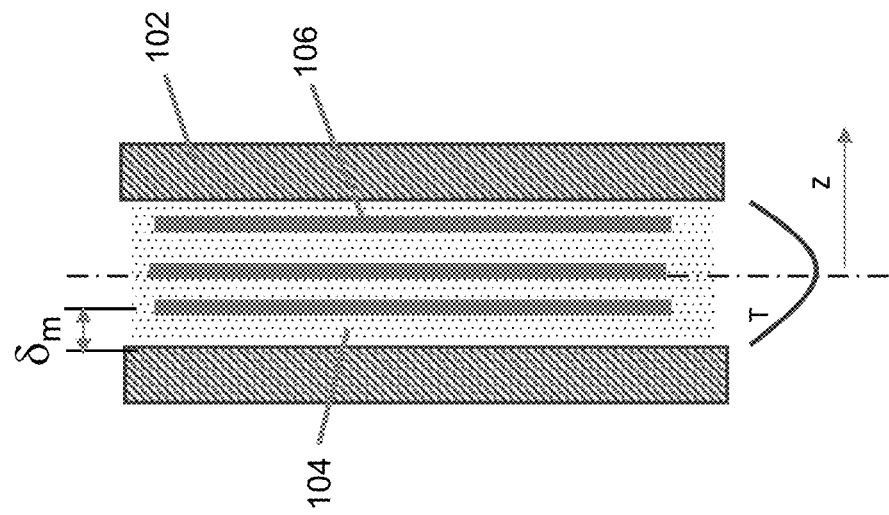
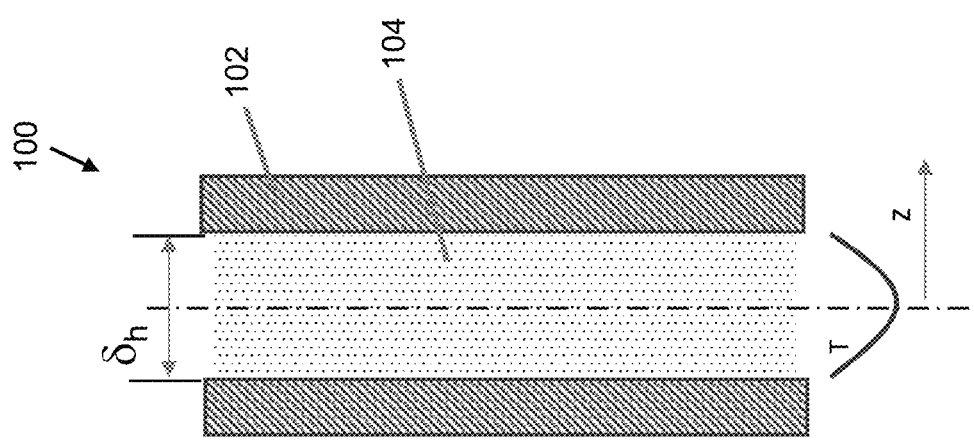
Fig. 1A
Fig. 1B

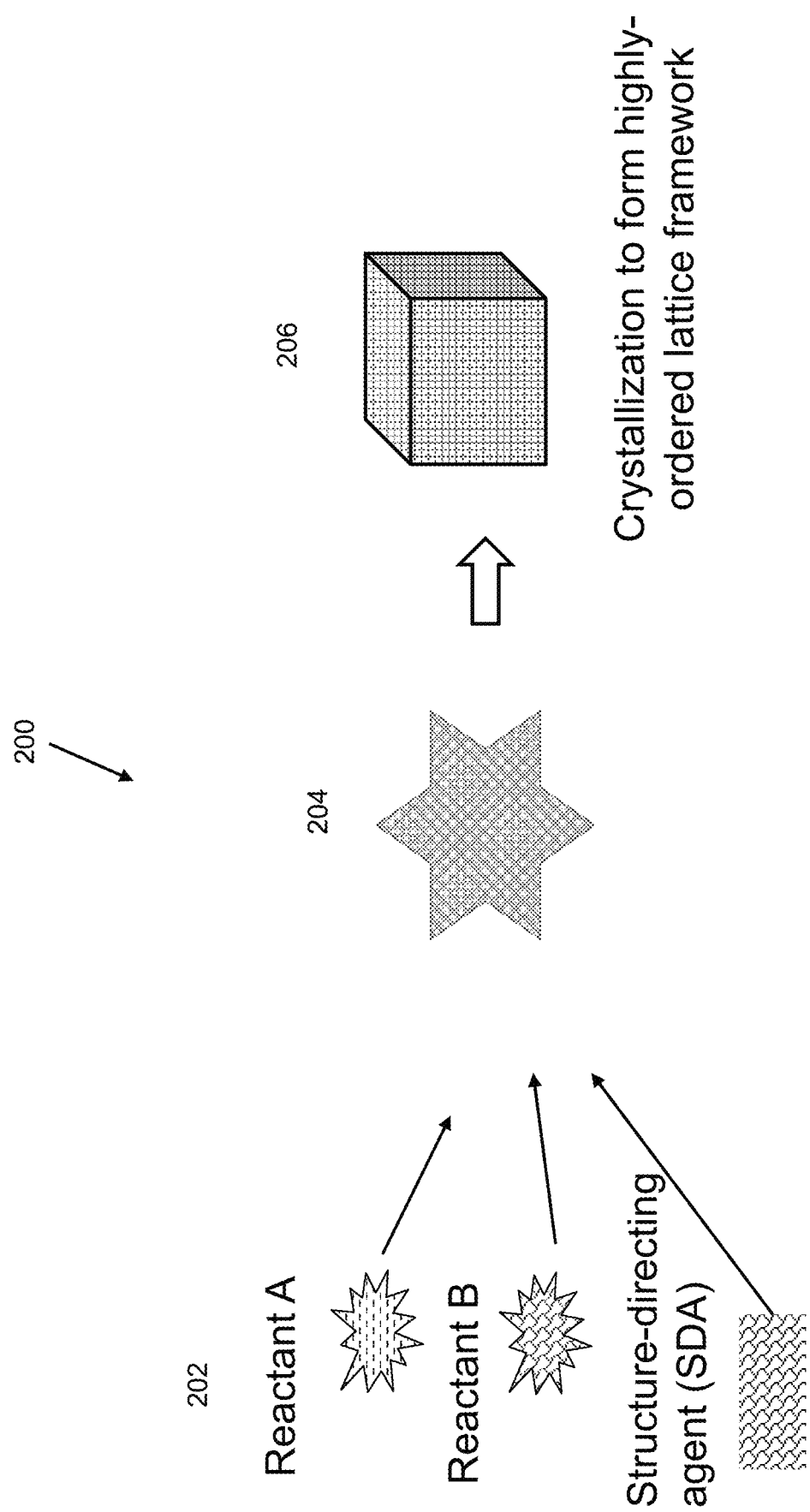

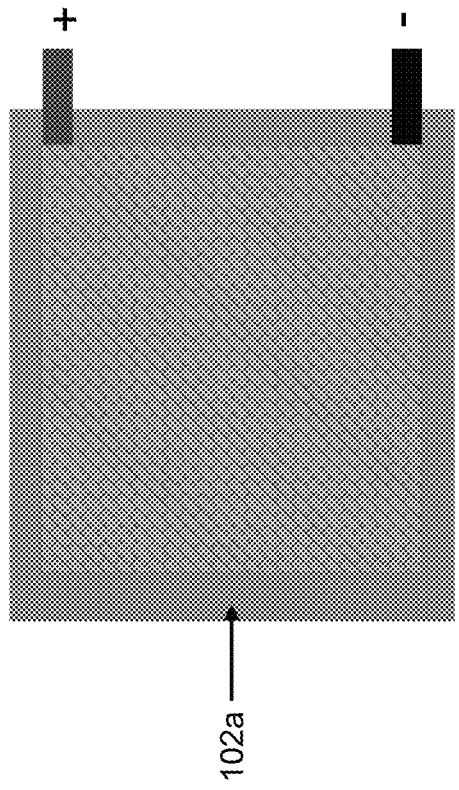
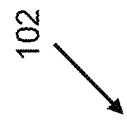
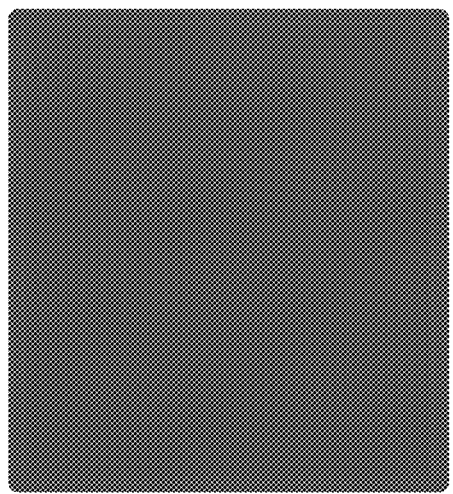
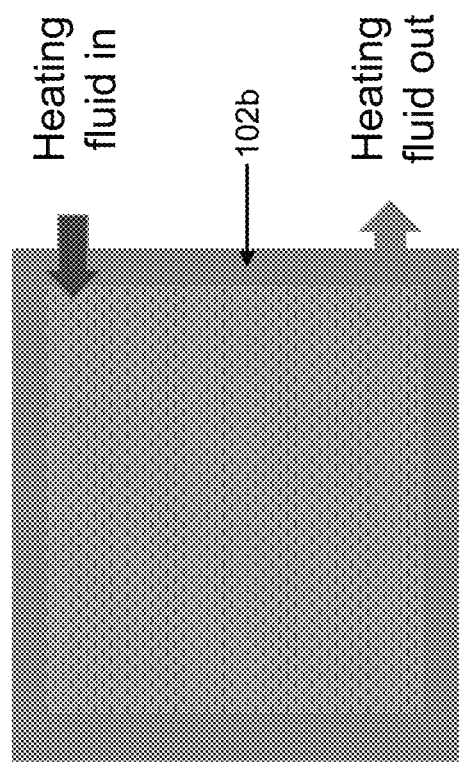

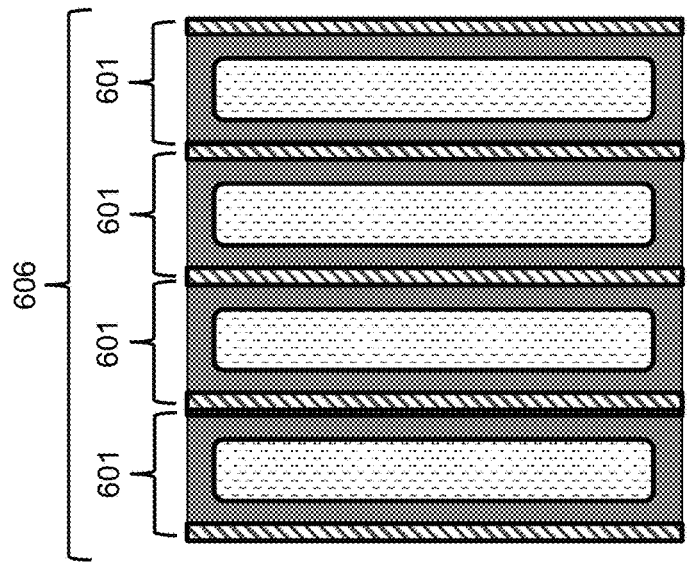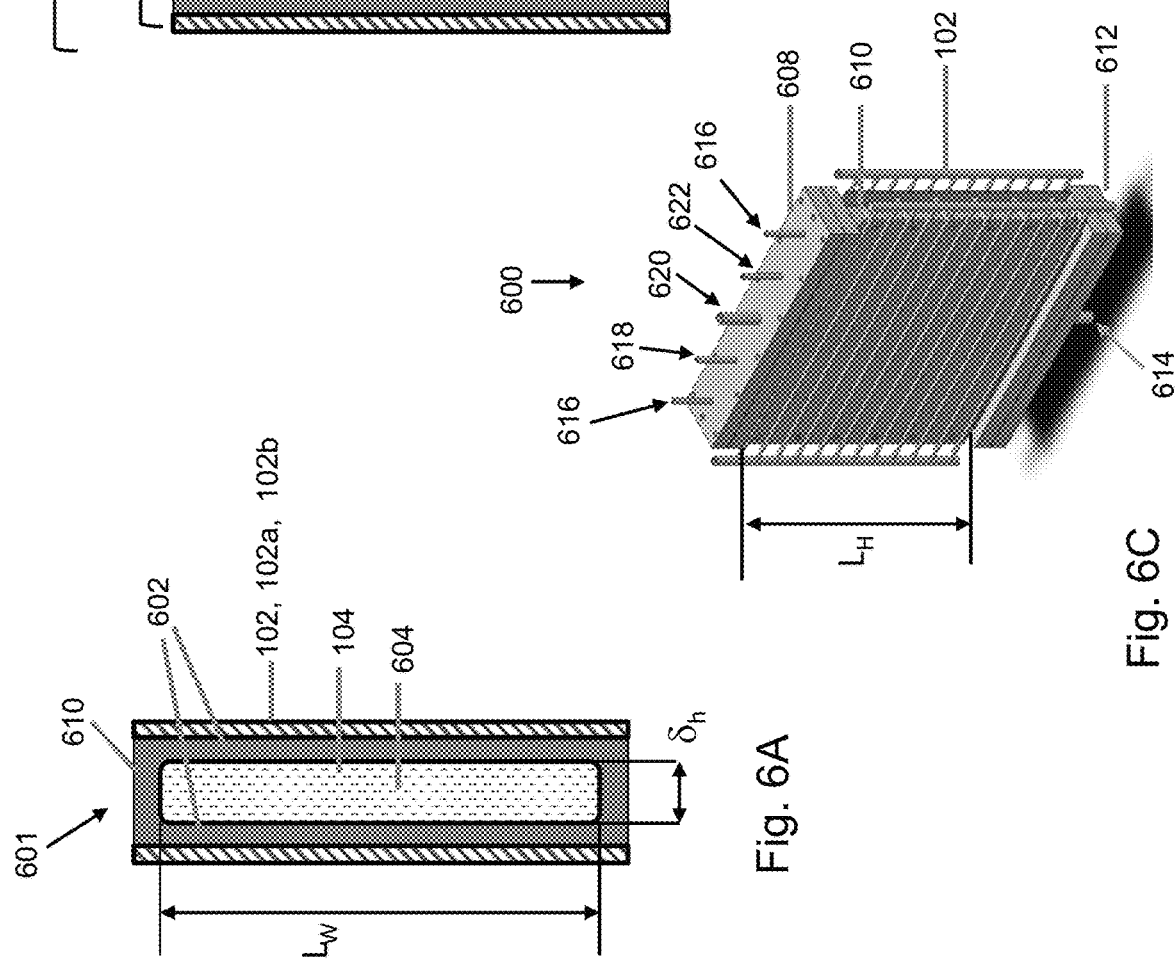
Fig. 6A  Fig. 6B  Fig. 6C

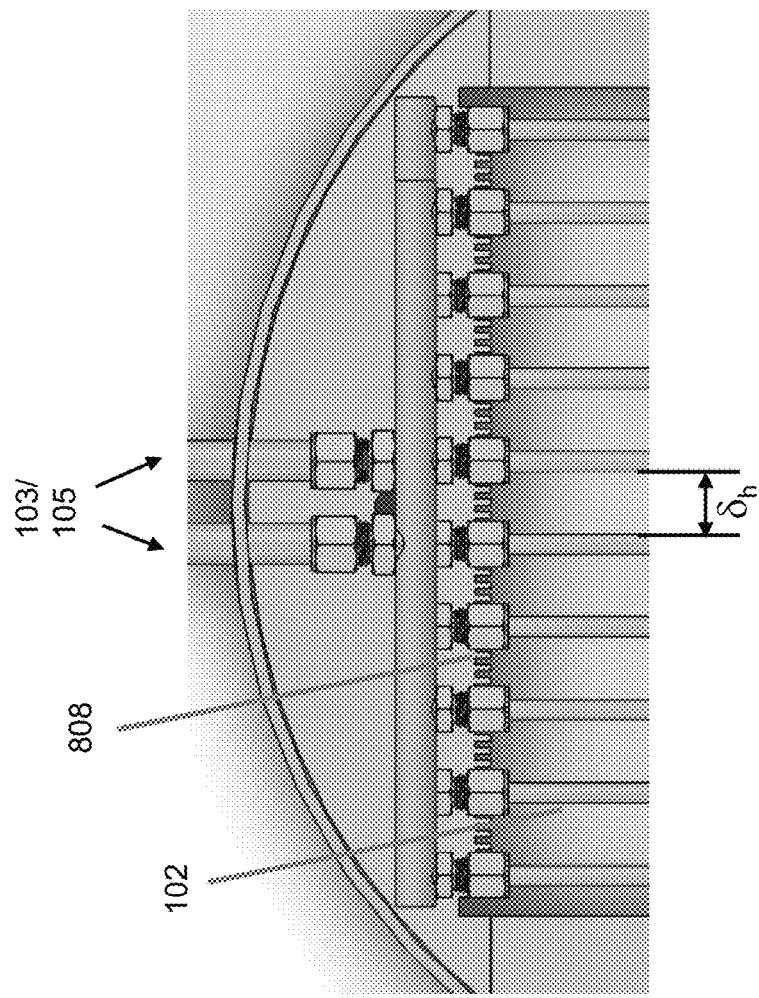
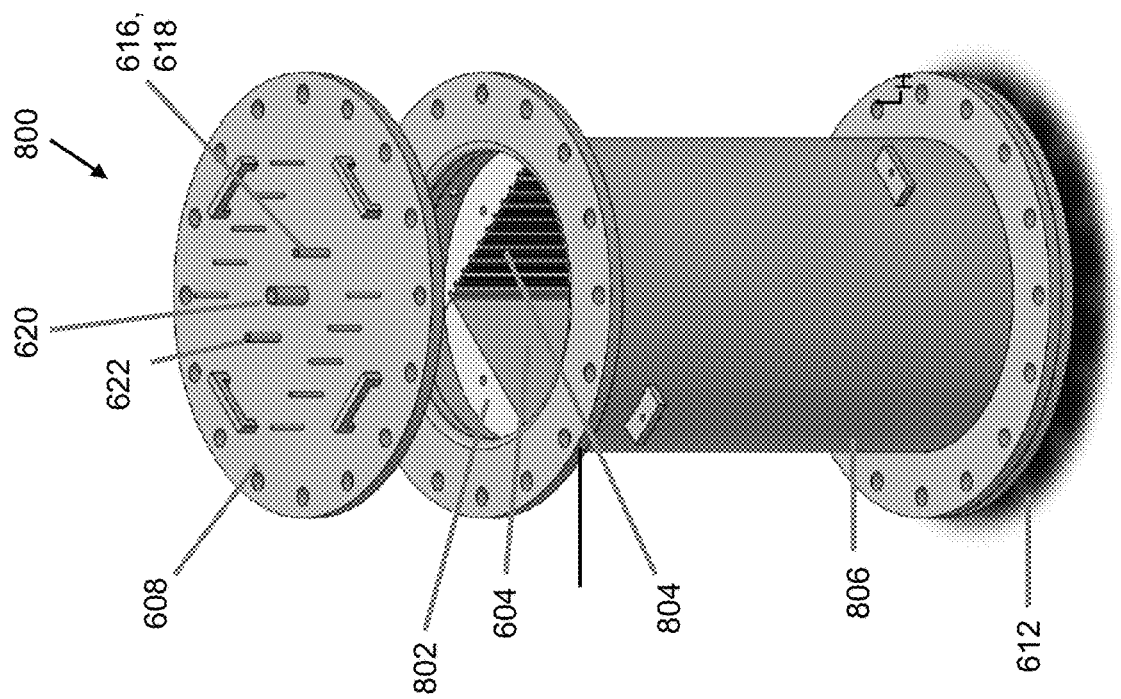
Fig. 8B
Fig. 8A

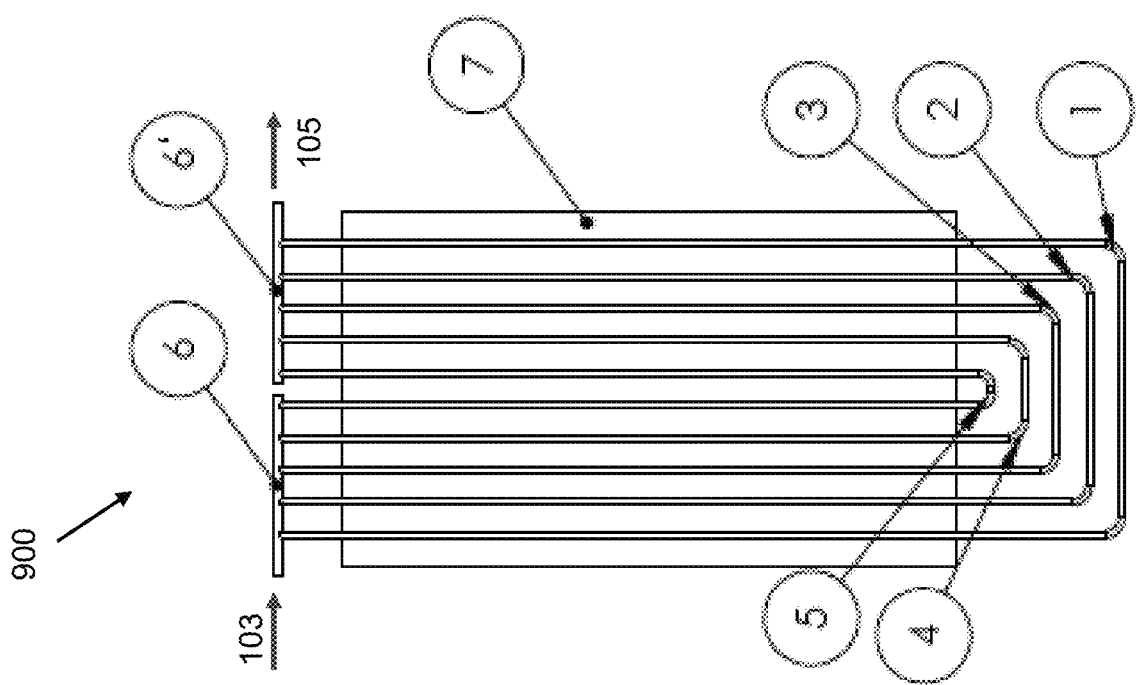

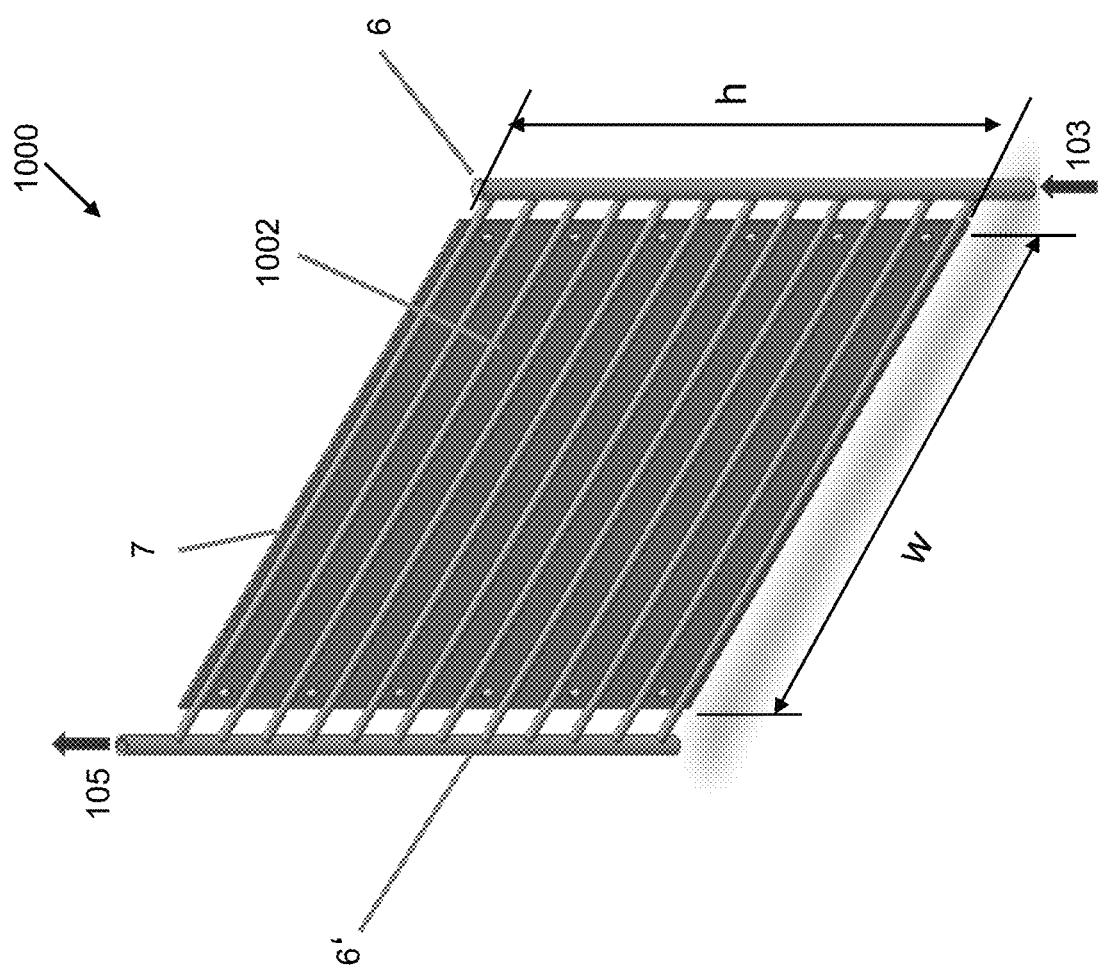

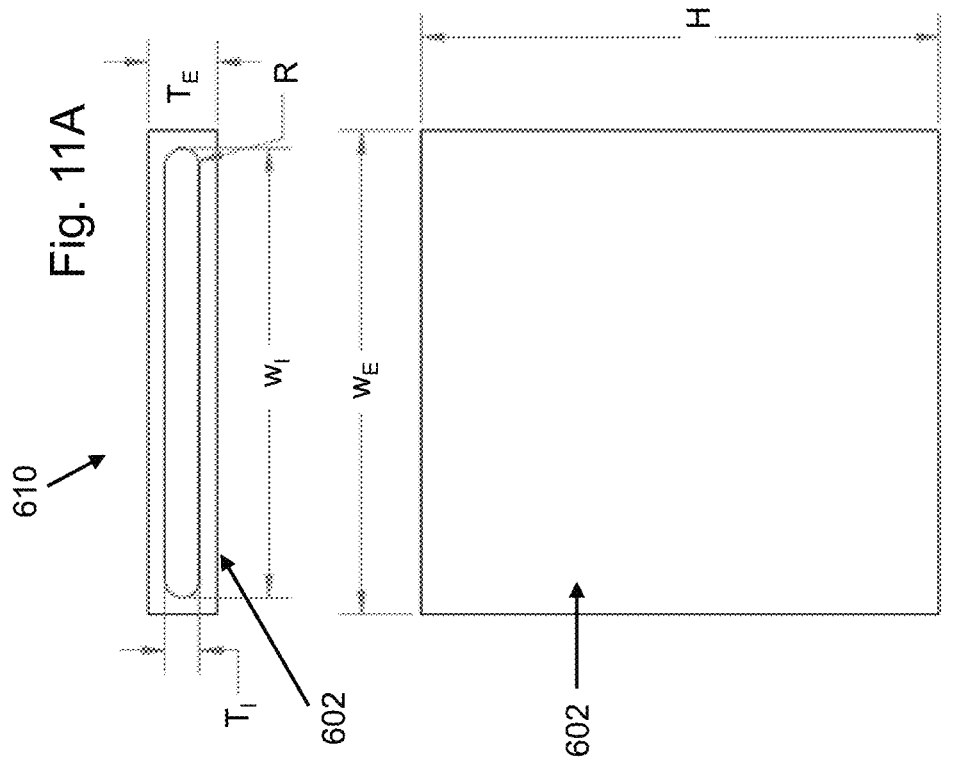

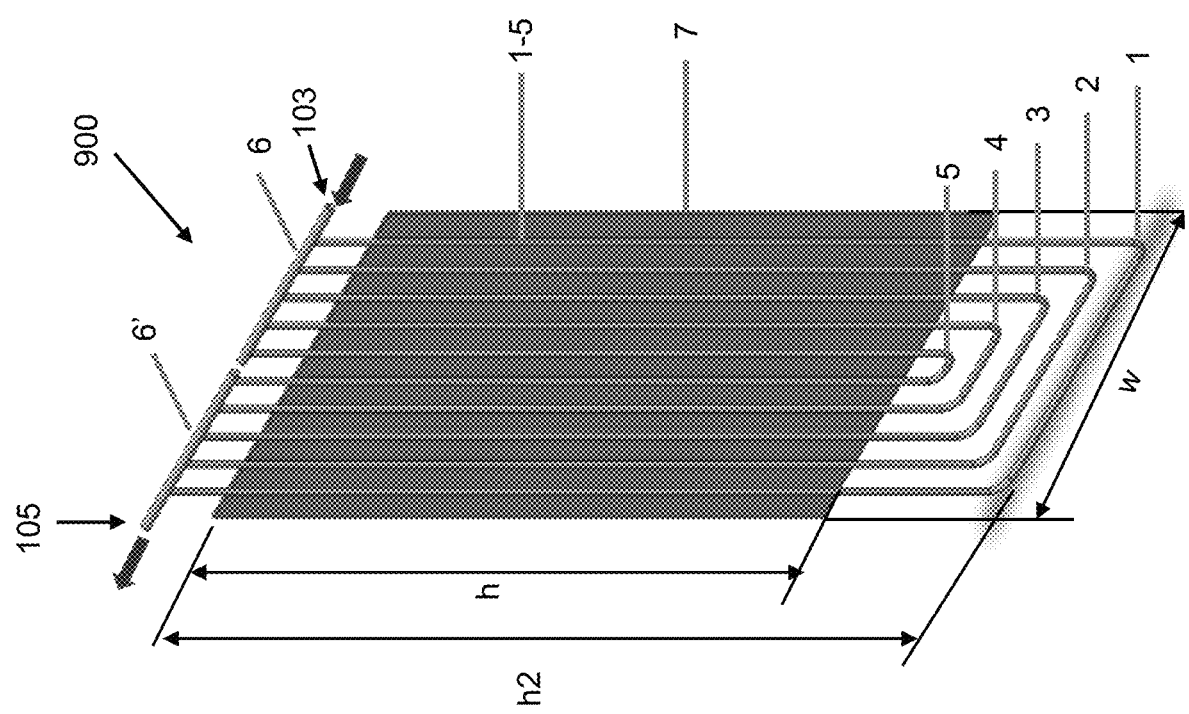

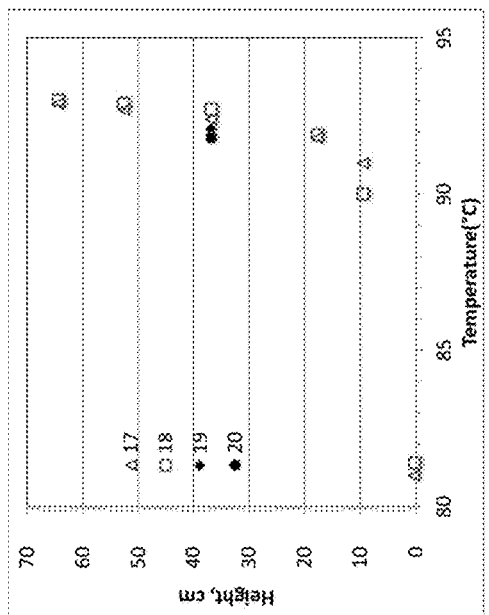
Fig. 17A
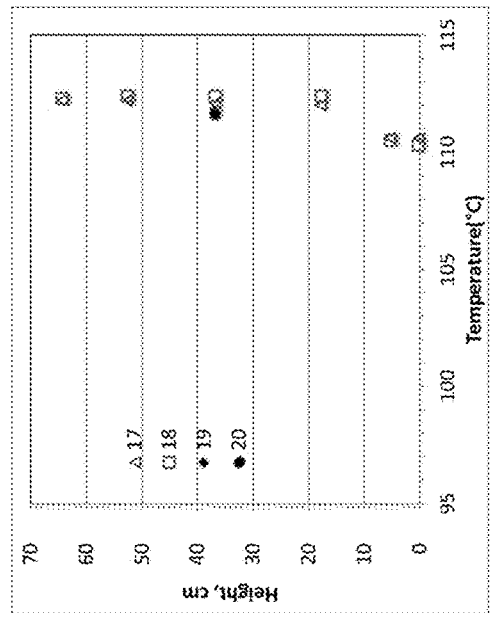
Fig. 17B
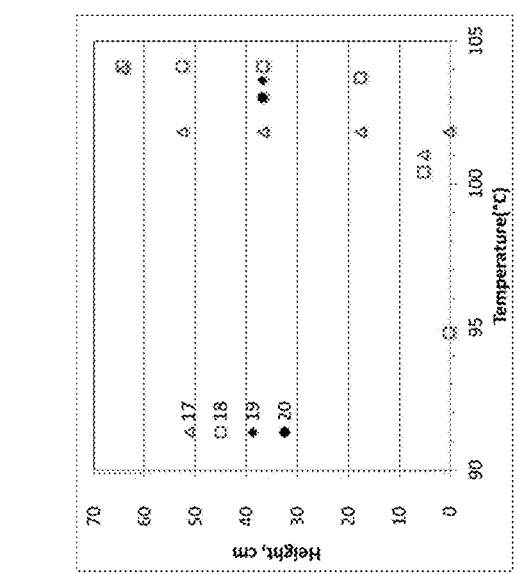
Fig. 17D
Fig. 17C

REACTOR FOR HYDROTHERMAL GROWTH OF STRUCTURED MATERIALS

CROSS REFERENCE TO RELATED PATENT APPLICATION

This application is a Divisional of U.S. patent application Ser. No. 16/235,655, filed Dec. 28, 2018, which claims the benefit of U.S. Provisional Application No. 62/723,845, Aug. 28, 2018, both of which are hereby incorporated by reference in their entirety.

FIELD OF THE INVENTION

The embodiments disclosed herein are generally directed to reactors, and specifically to hydrothermal reactors for growth of structured materials in liquid phase by heating.

BACKGROUND OF THE INVENTION

Structured materials are often synthesized through hydrothermal reaction processes, i.e., heating the liquid-phase precursor material under a certain temperature profile. To keep the solvent in the liquid phase, the heating is typically conducted in a closed or pressurized reactor vessel, e.g. an autoclave reactor. Examples of structured materials include zeolites, meso-porous silica and alumina, and metal organic frameworks. Zeolites are crystalline materials mostly comprising aluminum-silicon metal oxide compounds and have found industrial applications. A good amount of fundamental knowledge on synthesis chemistry and properties of zeolite materials has been obtained (see "Handbook of Zeolite Science and Technology" eds. by Scottm Auerbach, Kathleena Carrado, and Prabirk Dutta, 2003 Marcel Dekker, Inc.). By contrast, innovations on the reactor apparatus and processes to produce zeolite materials at large scale are very limited. Almost all hydrothermal syntheses are conducted in cylindrical autoclave reactors. An internal mechanical stirrer may be used to enhance mass and heat transfer. However, uniform heating of such reactors at large scale is difficult. On the other hand, temperature has large impact on quality and productivity of the zeolite synthesis. At the same growth time, the crystallinity increases with growth temperature. At the same crystallinity level, crystal linear growth rate rapidly increases with temperature. If the growth rate is described by a simple Arrhenius equation, the resulting apparent activation energy is 44 to 80 kJ/mol for A-type zeolite, 50 to 65 kJ/mol for Faujasite-type zeolite (X and Y), 58 to 63 kJ/mol for Mordenite, 50 to 90 kJ/mol for Silicalite, and 80 to 90 kJ/mol for ZSM-5.

Zeolite synthesis by microwave heating has been explored to enhance productivity (Wm. Curtis Conner, and Geoffrey Tompsett, Kyo-Ho Lee, and K. Sigfrid Yngvesson. "Microwave Synthesis of Zeolites: 1. Reactor Engineering" J. Phys. Chem. B, 108 (37) (2004)13913-13920). A recent report shows that zeolite crystals can be grown within a very short time by rapid mixing and rapid heating to exceptionally higher temperatures (300-370° C.) than what is typically used in the autoclave reactor (100-180° C.) (Zhendong Liu, Kotatsu Okabe, Chokkalingam Anand, Yasuo Yonezawa, Jie Zhu, Hiroki Yamada, Akira Endo, Yutaka Yanaba, Takeshi Yoshikawa, Koji Ohara, Tatsuya Okubo, and Tom Wakihara, "Continuous flow synthesis of ZSM-5 zeolite on the order of seconds" Proc Natl Acad Sci of USA; 113(50): 14267-14271; 2016 Dec. 13).

The microwave heating and micro-reactor continuous synthesis studies demonstrate that the zeolite synthesis rate can be dramatically increased by rapid heating of the growth solution and/or raising the growth temperature. Uniform zeolite growth is another important consideration to obtain zeolite crystals of uniform sizes and crystallinity. The uniformity becomes particularly desirable for growth of zeolites on large structured bodies, such as zeolite membranes and films on a large support structure of planar or tubular form. Different from zeolite synthesis in powder form, non-uniform growth of a zeolite membrane can result in complete failure of the whole structured body. The zeolite membrane could lose its molecular separation functions if incomplete growth occurs on some areas or spots. Mechanical stirring becomes ineffective for growth of a large structured body in a conventional cylindrical reactor.

SUMMARY OF THE INVENTION

An embodiment is drawn to a porous structured material made by a hydrothermal growth reactor, the hydrothermal growth reactor including a plate-shaped reactor vessel configured to contain a solution comprising a precursor and a structured material within a slot, the reactor vessel having a plate width and length at least three times of a length of an aperture size of the slot. At least one major surface heating area of the reactor vessel is capable of heating the solution inside contained in the slot in the reactor vessel at a heating rate to minimize a temperature variance inside a reactor growth zone and at least one removable cover for transporting the structured material out of the reactor vessel. The reactor is configured for synthesis of the porous structured material in a solution by heating at a temperature less than 300° C.

An embodiment is drawn to a method of making a porous structured material including providing a hydrothermal growth reactor a reactor vessel for containment of a precursor and a structured material, the reactor vessel comprising at least two planar heaters configured with even spacing having an aperture and for uniform heating at a controllable rate of the precursor and the structured material, wherein a width and a length of the planar heater is at least three times the spacing and at least one removable cover configured to transport the structured material into and out of the reactor vessel. The method also includes providing a structured material to the aperture, providing a growth solution comprising the precursor to the reactor vessel and synthesizing the porous structured material on the structured material by heating at a temperature less than 300° C.

BRIEF DESCRIPTION OF THE DRAWINGS

FIGS. 1A and 1B are a schematic illustrations of hydrothermal growth reactors for use in growing: FIG. 1A particles and FIG. 1B membrane sheets according to an embodiment.

FIG. 2 is a material transformation diagram illustrating the growth mechanism of a structured particle from a homogeneous solution according to an embodiment.

FIGS. 5A-5C are plan views of embodiments of planar heaters.

FIG. 6A is a schematic illustration of a plate-shaped reactor vessel with external planar heaters according to an embodiment.

FIG. 6B is a schematic illustration of an array of plate-shaped reactor vessels with external planar heaters according to an embodiment.

FIG. 6C is a perspective view of an apparatus comprising a plate-shaped reactor vessel with external planar heaters according to an embodiment.

FIG. 8A is a perspective view of a cylindrical reactor vessel according to an embodiment.

FIG. 8B is a cross section through the apparatus of FIG. 8A.

FIG. 9 is a schematic illustration of a planar heater with thermal fluid according to an embodiment.

FIG. 10 is a perspective view of a planar heater with thermal fluid according to another embodiment.

FIG. 11A is a plan view of a plate-type reactor vessel according to an embodiment.

FIG. 11B is a side view of the plate-type reactor vessel of FIG. 11A.

FIG. 11C is a perspective view of the plate-type reactor vessel of FIG. 11A.

FIG. 15 is a perspective view of a planar heater configured for immersion in a growth solution.

FIG. 17A is a plan view of cylindrical growth vessel illustrating the location of thermocouples according to an embodiment.

FIGS. 17B-17D are plots illustrating the temperature distribution in the cylindrical growth vessel of FIG. 17A.

DETAILED DESCRIPTION OF THE INVENTION

Figure 3:
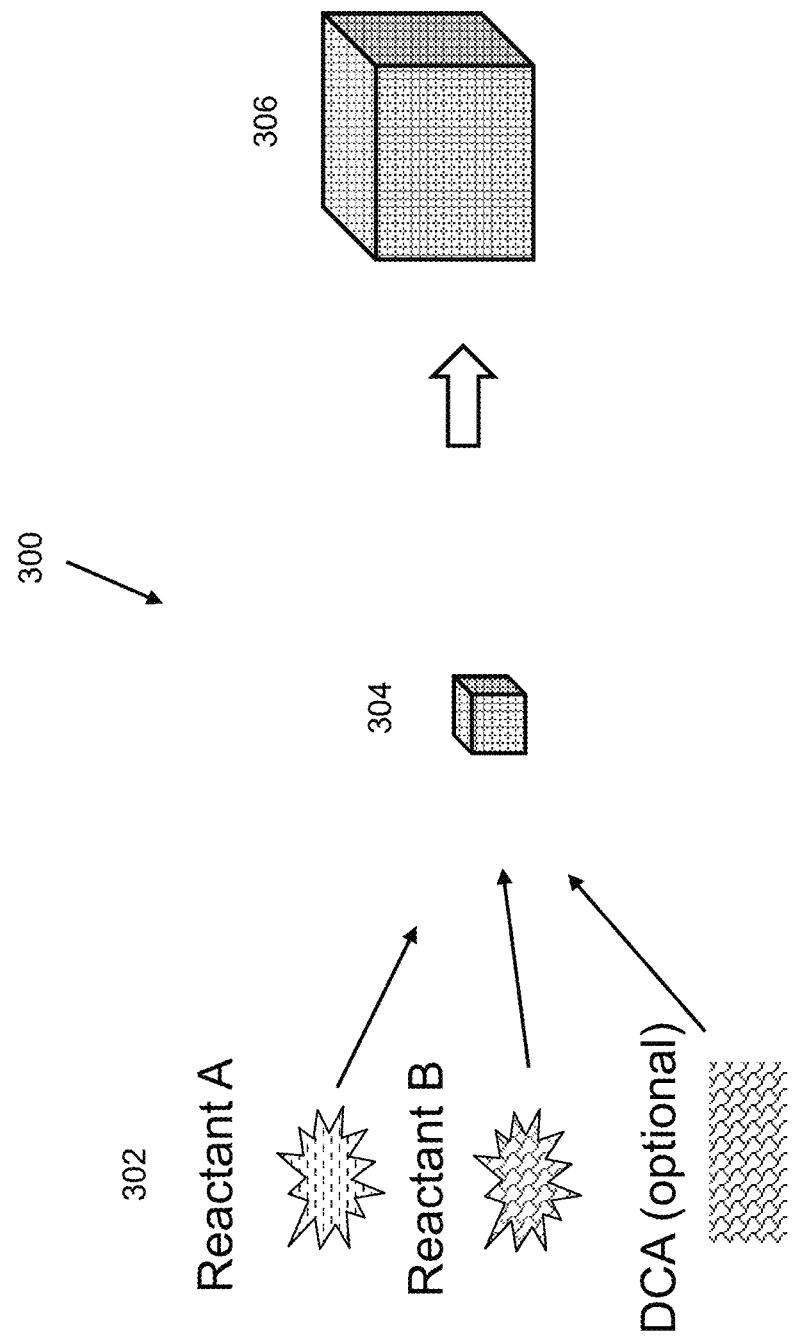
FIG. 3 is a material transformation diagram illustrating the growth mechanism of a structured particle from a homogeneous solution with suspended seeds according to an embodiment.
Figure 4:
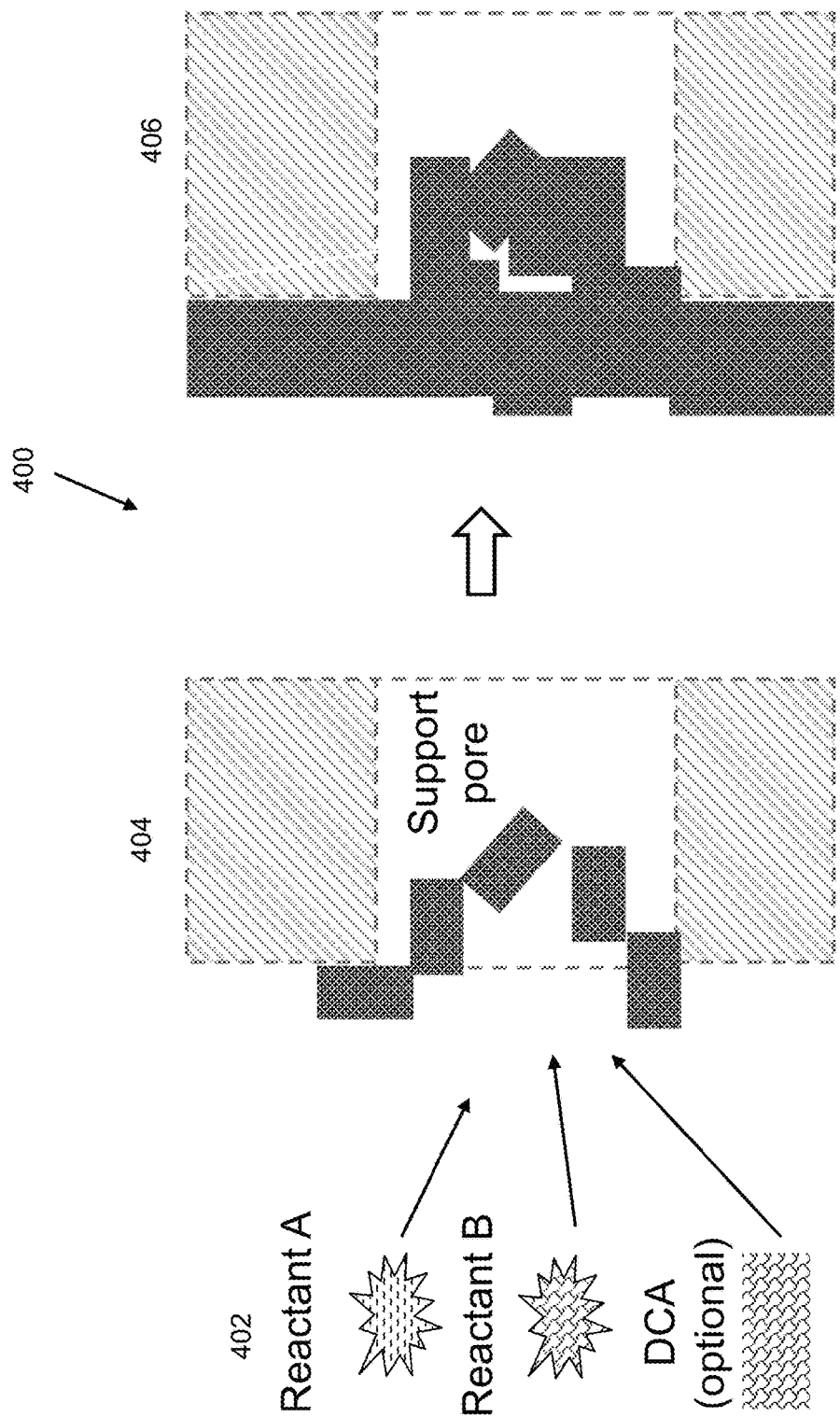
FIG. 4 is a material transformation diagram illustrating the growth mechanism of a continuous membrane from a seeded structure according to an embodiment.

Embodiments of reactors described herein are for synthesis of structured materials by heating a solution or liquid fluid under a controlled temperature profile, i.e., hydrothermal synthesis. The structured materials may be particles, membranes or films of micro-porous molecular sieve crystals such as zeolite and meso-porous materials. Hydrothermal synthesis of various materials is classified into three process routes based on the fundamental structural growth mechanisms as illustrated in FIGS. 2-4. In a first process route 200 (FIG. 2), a homogeneous solution, mixture or gel containing all the reactants and additives is made, step 202, in which the molecules are self-assembled into "soft" agglomerates of pseudo structures, step 204, that are further converted into "hard particles" of highly-ordered structures by heating, step 206. Synthesizing a structured material often requires more than one reactant. For example, both an Al precursor such as aluminum hydroxide and a Si precursor such as sodium silicate are used to grow zeolite crystals comprising Si and Al atoms in a lattice framework. In the synthesis of a metal organic framework, a metal precursor such as $ZrCl_4$ and ligand precursor such as benzenedicarboxylic acid are used. Very often, a structure-directing agent (SDA) is added into the solution to facilitate or enable formation of the desired structures. For example, tetrapropylammonium alcohol (TPA) and tetrapropylammonium bromide (TPAB) are commonly used to synthesize MFI-type zeolites. The "soft" agglomerate can be viewed as all the reactants being gathered together but without formation of strong chemical bonds, which are fluidic and almost inseparable from the solvent. A "hard" particle is a particle of ordered structures with strong chemical bonds, which forms a distinctive solid-state phase.

In the second process route 300 (FIG. 3), small seeding crystals are suspended in the growth solution as nuclei for particle growth of the desirable structures, step 302. The seeds are small enough to be suspended in the solution without precipitation. The reactants in the growth solution attach to the seed crystal, thereby initiating growth, step 304. The particle or crystal grows from the seed by consuming the reactants, step 306.

In the third process route 400, the seeds are deposited onto a support structure to make the growth occur on the seeded structure to form a membrane, film or coating layer. For membrane growth, a porous support structure is used. As illustrated in FIG. 4, reactants are provided in step 402. Then, the seeds are dispersed in and on the support pores, step 404. The order of these steps may be reversed. That is, the seed may be dispersed in an on the support pores, step 404, prior to providing the reactants in step 402. Under the growth conditions, the crystals grow larger and fill the inter-particle voids to form a continuous membrane layer, step 406.

All these growth processes 200, 300, 400 involve re-arrangement of atomic structures, which are liquid-solid and solid-solid reaction processes. The reaction or synthesis rate is described by the following equation:

$$\frac{dL_s}{dt} = k_{app} \cdot C_A^n \cdot C_B^m \qquad \text{Equation 1}$$

Where $L_s$=linear dimension of the structured material, $k_{app}$=apparent rate constant, $C_A$=concentration of reactant A on the particle surface, and $C_B$=concentration of reactant B on the particle surface.

The relationship of the rate constant with temperature is described by Arrhenius equation:

$$k_{app} = k_0 \cdot \exp\left[-\frac{E_{app}}{R}\left(\frac{1}{T} - \frac{1}{T_0}\right)\right] \qquad \text{Equation 2}$$

Where $k_0$=apparent rate constant at reference temperature, $E_{app}$=apparent activation energy, R=gas constant, T=reaction temperature, $T_0$=reference temperature.

The temperature has as strong impact on the growth rate of the structured material. If the activation energy is 90 kJ/mol, the growth rate at 373K (100° C.) is 1145 times of the growth rate at room temperature (293K). In order to obtain uniform and rapid growth, having uniform heating and temperature in the growth zone is desirable.

A planar heater 102 is described herein to be used in a growth reactor in which uniform and rapid growth is achieved. As illustrated in FIG. 5A, the planar heater 102 provides a uniform temperature distribution over a flat surface. The temperature variation, as measured by standard deviation, is preferably less than 20° C., more preferably less than 10° C. In an embodiment, the planar heater 102a can be fabricated by distributing electrical heating elements on a flat substrate and heated by electrical power (FIG. 5B). For example, a resistance heating wire can be embedded on a ceramic plate and sheathed by protective covers. In an alternative embodiment, the planar heater 102b can also be fabricated by embedding flow channels on or in a flat plate and heated up by use of thermal fluid (FIG. 5C).

A planar heater 102b using thermal fluid is different from planar heat exchangers. Heat exchangers are designed to achieve the largest temperature gradient between the two fluids, while the planar heaters of present embodiment are designed to provide a heating surface of nearly uniform temperatures. Thus, the fluid paths in the present planar heater 102b are arranged in such a way that the temperature variation on the whole heating area is minimized.

A reactor 600 for isothermal growth may be fabricated by use of the planar heater 102, 102a, 102b in two configurations: external heating and internal heating. The externally-heated reactor 600 is illustrated in FIGS. 6A-6C. A plate-type reactor vessel 610 is made to hold the growth solution 104 with two larger external surfaces 602 being heated by the respective planar heaters 102, 102a, 102b. FIG. 6A shows a single unit 601 (plate-type reactor vessel 610 and planar heaters 102, 102a, 102b). A group of identical reactor vessels 610 and heaters 102,102a, 102b can be packaged together to obtain an array 606 of units (FIG. 6B). The plate-type reactor 600 may be characterized in that the heat transfer between the internal growth solution 104 and the external environment is dominated by the heat transfer on the two larger flat surfaces 602. Such characteristics can be measured by aspect ratios of the reactor thickness to its width and height. Preferably the ratio is greater than 3. The definition of the reactor thickness on and width $L_w$ is shown in FIG. 6A, while the definition of the height $L_H$ is shown in FIG. 6C. The thickness $\delta_h$, width $L_w$, and the height $L_H$ are measures of the dimensions of the growth zone 604.

A complete assembly of a plate-type growth reactor 600 is illustrated in FIG. 6C, which comprises top cover 608, body of reactor vessel 610, two side heaters 102b, and bottom cover 612. The top and bottom covers 608, 612 seal the growth solution 104 inside the reactor vessel 610 and allow controlled exchanges between the interior and the environment. The bottom cover 612 may contain an outlet port 614 for transporting the solution 104 (discharging, addition), a port (not shown) for introducing gas for agitating the solution, and/or a port (not shown) for connection of instruments (thermocouples). The top cover 608 may contain an outlet port 622 to relieve pressure, a port 620 for transporting the fluid (discharging of vapor or addition of the solution), and/or port(s) 616, 618 for connection of instruments (thermocouples, pressure gauges). The four corners inside the reactor vessel are preferably rounded to enhance its mechanical strength and minimize stagnant space inside the reactor. In an embodiment, the surface planar heater 102, 102a, 102b is in intimate contact with the reactor side wall 602 as judged by no visible air gap to assure effective heat transfer. The reactor vessel 610 is preferably made of materials that have high mechanical strength, high stability under the growth conditions, and high thermal conductivity. The preferred material is steel or metal alloys. The whole reactor apparatus 600 may be insulated for effective temperature control and to save heating energy.

Figure 7:
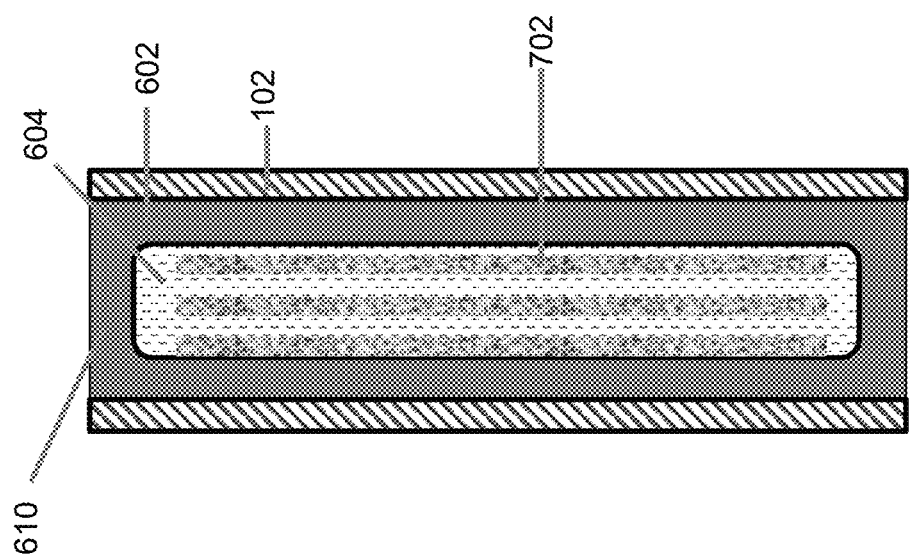
FIG. 7 is a schematic illustration of a plate-shaped reactor vessel with external planar heaters configured for growth of structured parts according to an embodiment.

For growth of structured particles, the reactor vessel 610 is filled with a growth solution 104, and the growth is carried out by heating the growth solution 104 under a desirable temperature profile by controlling the planar heater temperature. For growth of a membrane or film on a support structure such as membrane sheets 702, the membrane sheets 702 are loaded into the reactor vessel 610 and immersed in the growth solution 104, as shown in FIG. 7. The growth is conducted by heating the growth solution 104 and membrane sheet 702 with the planar heaters 102 under the desired temperature profile. A fixture may be used to keep the surface of the membrane sheet 702 fully exposed to the growth solution 104 without touching with the reactor wall 602 or with other membrane sheets 702 when multiple membrane sheets 702 are loaded into one reactor vessel 610.

In a second configuration 800 of a growth reactor using planar heaters 102, the planar heaters 102 are immersed inside the growth solution 104. The second configuration 800 is illustrated with a cylindrical-shaped reactor vessel 806 in FIGS. 8A and 8B. The cylindrical-shaped reactor vessel 806 may be fabricated in other shapes, such as square or rectangular. The reactor apparatus 800, (FIG. 8A) comprises i) top cover 608, ii) space filler 802, iii) reactor vessel body 806, and iv) bottom cover 612. The top and bottom covers 608, 612 may contain ports for transporting fluids in and out 612, 620, to relieve pressure 622, or for instrument connections 616, 618. The space filler 802 is used to form an isothermal growth zone of a rectangle or square-shaped cross-section for installation of the planar heaters 102 while minimizing stagnant space. A group of planar heaters 102 may be installed in the growth zone 604 with even spacing as shown in FIG. 8B. For membrane growth on a support sheet, the membrane sheet fixture can be built into the space filler 802 to keep the individual membrane sheets 702 apart in the growth zone 604. The planar heaters 102b shown in FIG. 8B use a thermal fluid as a heat source. A group of heaters 102b are connected to a common thermal fluid inlet and outlet 103/105. Design features of such a planar heater 900 are shown in FIG. 9. In an embodiment, five U-shaped heating tubes 1-5 may be fixed on a flat substrate plate 7 with even-spacing for generating uniform temperature distribution on the whole substrate plate 7. One end of each a tube is connected to an inlet manifold 6, while the other end of the tube is connected to an outlet manifold 6'. The heating tubes may be, but are not limited to, ⅛", 3/16", ¼" or 5/16" OD standard tubes. The manifold tube internal diameter is preferably properly sized according to the flow rate, length, heating tube diameter, and operating conditions (T, P). In general, the pressure drop in the manifold tubes 6, 6' should be substantially less than the pressure drops in the heating tubes 1-5. The flat substrate 7 serves two purposes. One purpose is to fix the heating tubes 1-5 in the designated spacing. The second purpose is to redistribute the heat from each heating tube 1-5 to generate a uniform temperature distribution on the plate 7. The substrate plate 7 should have high thermal conductivity and mechanical strength. The substrate plate 7 is sized according to width and height of the heating zone, e.g. growth zone 604.

The characteristic heat transfer dimension is one design parameter of the growth reactor 100, 600, 800. This dimension is defined as the thickness of the growth solution 104 to be heated. For a plate reactor with external heating 600 (FIG. 6A), the characteristic heat transfer dimension is the aperture of the reactor vessel slot, because the high thermal conductivity of the vessel wall 602 presents negligible heat transfer resistance relative to the solution 104. For the reactor vessel with internal heating 800, the characteristic heat transfer dimension is the spacing ($\delta_h$) between the planar heaters (FIG. 8B). The limitation of heat transfer in the growth solution 104 is evident by comparing the thermal conductivity of different materials in Table 1. The liquid commonly used for hydrothermal growth, such as water and organic solvents, has orders of magnitude lower thermal conductivity than metals. Porous structured materials, such as zeolites, also have low thermal conductivity. Enhancing the heat transfer in the growth solution 104 is desirable to obtain rapid and uniform growth.

TABLE 1

Thermal conductivity of materials relevant to present application

| Material | Temperature (° C.) | Thermal conductivity (W/mK) |
|---|---|---|
| Metals | | |
| Aluminum, pure | 20 | 204 |
| Carbon Steel, max 0.5% C | 20 | 54 |
| Copper, pure | 20 | 386 |
| Nickel | 20 | 90 |
| Stainless Steel | 20 | 12-45 |
| Titanium | 20 | 19-23 |
| Solution | | |
| Water | 20 | 0.61 |
| Methyl Ethyl Ketone (MEK) | 25 | 0.145 |
| N,N-dimethylformamide (DMF) | 25 | 0.184 |
| Porous solid material | | |
| Wetted zeolite | 20 to 60 | 0.16 to 0.21 |

The heating process of a static solution with a planar heater 102 is described by the following equation:

$$C_p \cdot \rho_s \cdot \frac{\partial T}{\partial t} = k \cdot \frac{\partial^2 T}{\partial z^2} \quad \text{Equation 3}$$

Let $\varphi = T/T_0$, $\theta = z/\delta_h$ $$\frac{C_p \cdot \rho_s \cdot \delta_h^2}{k} \cdot \frac{\partial \varphi}{\partial t} = \frac{\partial^2 \varphi}{\partial \theta^2} \quad \text{Equation 4}$$

Let $\tau = \frac{C_p \cdot \rho_s \cdot \delta_h^2}{k}$ \quad Equation 5

$$\tau \cdot \frac{\partial \varphi}{\partial t} = \frac{\partial^2 \varphi}{\partial \theta^2} \quad \text{Equation 6}$$

Where $C_p$=specific heat capacity of growth solution medium, J/kg/K; $\rho_s$=density of growth medium, kg/m$^3$; $\delta_h$=characteristic heat transfer dimension, m; k=thermal conducting coefficient, W/(m·K); T=temperature at growth time (t) and location (z), K; z=depth of the solution from the heated surface; $T_0$=reference temperature, K; $\tau$=characteristic heating time, s.

The characteristic heating time, $\tau$, determines the uniformity of the temperature distribution in the heating zone when the growth solution is heated from the reference temperature $T_0$ by the planar heater(s) 102. The smaller the $\tau$ number is, the less steep the temperature distribution. For a given growth media, the specific heat capacity ($C_p$), the density ($\rho_s$), and the thermal conductivity coefficient (k) are fixed. Thus, the characteristic heat transfer dimension ($\delta_h$) is the main parameter for reactor design.

Most hydrothermal syntheses of structured materials take place over a temperature range of 20 (room temperature) to about 300° C. As described above, the crystal growth rate increases exponentially with temperature and the growth temperature also has significant impact on the crystal purity. Given the large impact of the temperature, the temperature variation within the growth zone 604 should be kept as small as possible during the heating process. For a practical growth process within a time frame in the order of hours, the characteristic heat transfer dimensions are preferably between 0.3 cm to 10 cm. If the characteristic dimension is too large, a long growth time (in the order of days) may be needed to heat up the reactor 100, 600, 800 without causing a large temperature variation in the growth zone. From a heat transfer point of view, the characteristic dimension should be as small as possible. If the characteristic dimension $\delta_h$ is too small, however, the reactor growth capacity becomes too low and the production cost would be very high. For example, a microchannel planar reactor of characteristic heat transfer dimensions less than 1.0 mm is excellent for heat transfer but would be expensive for production of structured materials in large quantities.

The present embodiment addresses a long-time scale-up problem with synthesis of structured materials on conventional cylindrical-shaped autoclave reactors. Those reactors are externally heated. The heat transfer and hydrodynamics inside the growth zone change dramatically as the reactor size is increased from laboratory, pilot-scale to manufacturing scale. The problem becomes more serious for growth of membranes 702 on a large support structure, such as tubes and sheets, because using an internal stirrer becomes very difficult. With the reactor 800 of present embodiment, scale-up becomes much simpler. By keeping the characteristic heat transfer dimension the same, scale up can be realized by i) increasing the area of the planar heaters 102; and ii) increasing the number of growth zones 604. For example, if a synthesis process is demonstrated at a characteristic heat transfer dimension of 10 mm over a heating surface area of 100 mm×100 mm in single growth zone, the same synthesis process can be enlarged by 100 times using 1000 mm×1000 mm heating area in each growth zone and by 10,000 times using 100 such growth zones, as long as the growth chemistry is kept the same.

Since the operating temperature (20-300° C.) and pressure (1-30 bar) for targeted hydrothermal growth processes are relatively low, the heaters 102, 102a, 102b and growth reactors 100, 600, 800 of embodiments herein can be made of commonly available, inexpensive materials, such as base metals (aluminum, copper, Ti), alloys (steels, nickel alloys), and ceramics (SiC, alumina, mullite). The simple structure taught herein enables the heaters 102, 102a, 102b and growth reactors 100, 600, 800 be fabricated without using complex and expensive manufacturing processes. Thus, the heaters 102, 102a, 102b and growth reactors 100, 600, 800 can be manufactured in large quantities at a cost level that is no longer a significant factor to the overall manufacturing cost of the structured material.

The designs, fabrication and working principles of embodiments herein are further demonstrated with the following examples.

Example I. A Planar Heater Made of Stainless Steel for Surface Heating

An embodiment of a planar heater 1000 is shown in FIG. 10. 12 straight stainless heating tubes 1002 are mounted onto a 320 mm×290 mm×2 mm flat stainless-steel plate 7 with even spacing. One end (inlet 103) of the 12 heating tubes 1002 are connected to a manifold tube 6 of larger diameter than the heating tubes 1002 to distribute the thermal fluid flow evenly into the individual heating tubes 1002. The other ends of the 12 heating tubes 1002 are connected to a manifold tube 6' for collecting the thermal fluid flows from individual heating tubes 1002 to one outlet 105. The flatness of the planar heater 1000 may be checked by placing it on a flat surface and showing no visible air gaps. The planar heater 1000 is pressurized to 8 bar (absolute) by air and shows no air leakage.

The surface temperature distribution of the heater 1000 may be surveyed by measuring the temperature at different positions on the plate 7 when heating oil flow is introduced. The planar heater 1000 is exposed to ambient air without any special control of the air flow dynamics. The air temperature is about 18-20° C. The temperatures of the heater surface are mapped at three different heating oil temperatures. The results are shown in Tables 2-4. Each measurement spot is located relative to the corner of the surface of the heater 102 where the heating oil is introduced. At the heating oil introduction area, the temperature is the highest. In the area where the heating oil exits, the temperature is the lowest. A temperature difference between the inlet 103 and outlet 105 is expected because of the heat loss. The average and standard deviation of the planar heater surface temperatures are 31±3° C., 40±3° C., and 56±6° C. for three respective heating oil inlet temperatures. The temperature uniformity can be improved by increasing the heating oil flow rate and controlling the air flow dynamics.

TABLE 2

Mapping of planar heater surface temperature (° C.) with 50° C. heating oil

| | Position along width, mm | | | | Avg. T, ° C. | STDEV, ° C. |
|---|---|---|---|---|---|---|
| | 0 | 20 | 160 | 300 | | |
| Position along height, mm | 20 | 33 | 33 | 31 | 31 | 3 |
| | 145 | 33 | 32 | 30 | | |
| | 270 | 30 | 28 | 25 | | |

TABLE 3

Mapping of planar heater surface temperature (° C.) with 80° C. heating oil

| | Position along width, mm | | | | Avg. T, ° C. | STDEV, ° C. |
|---|---|---|---|---|---|---|
| | 0 | 20 | 160 | 300 | | |
| Position along height, mm | 20 | 45 | 44 | 40 | 40 | 3 |
| | 145 | 44 | 42 | 38 | | |
| | 270 | 38 | 38 | 35 | | |

TABLE 4

Mapping of planar heater surface temperature (° C.) with 100° C. heating oil

| | Position along width, mm | | | | Avg. T, ° C. | STDEV, ° C. |
|---|---|---|---|---|---|---|
| | 0 | 20 | 160 | 300 | | |
| Position along height, mm | 20 | 64 | 61 | 58 | 56 | 6 |
| | 145 | 60 | 56 | 48 | | |
| | 270 | 58 | 55 | 46 | | |

Figure 12:
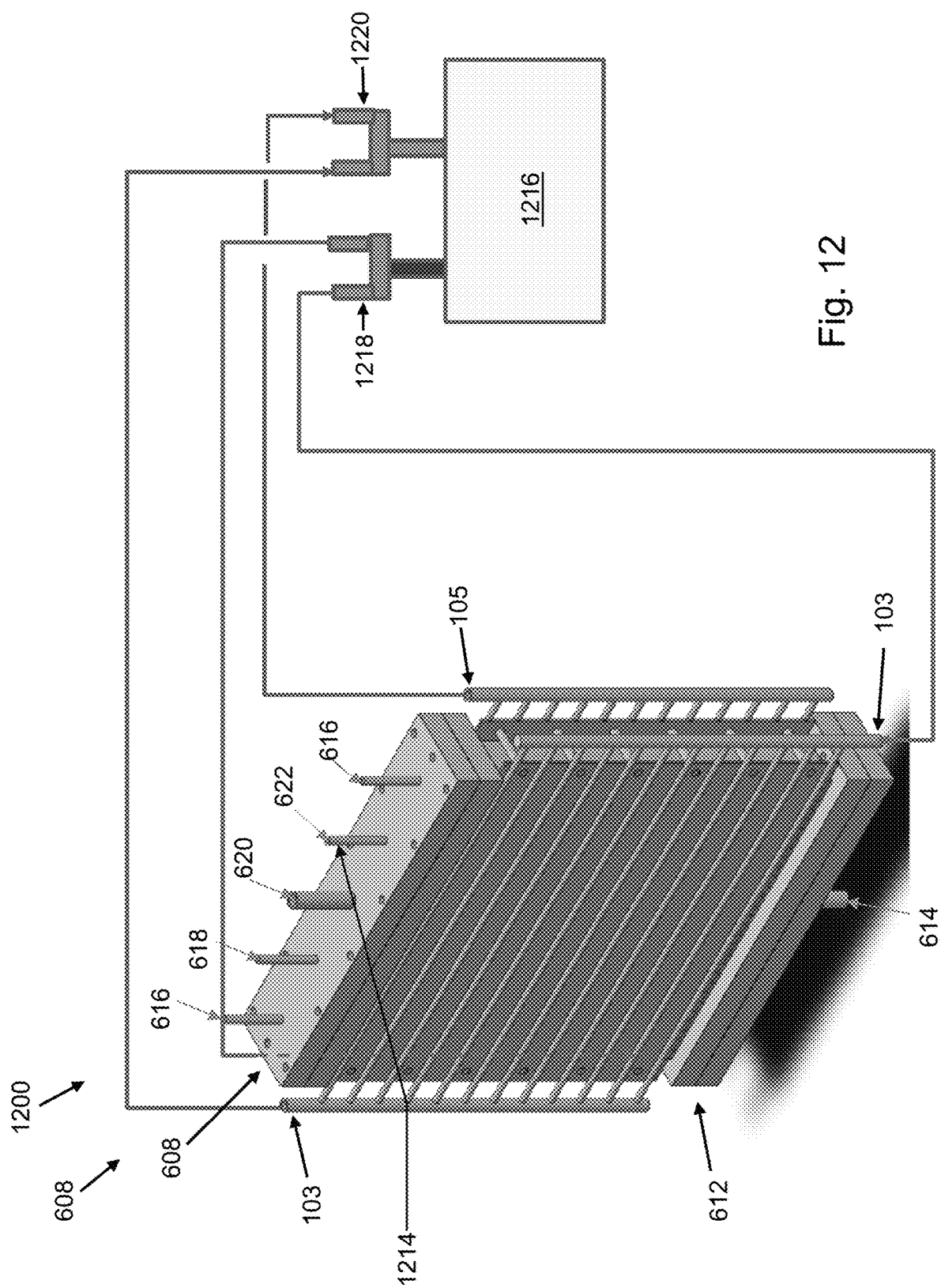
FIG. 12 is a perspective view of a plate-type reactor apparatus with heating oil according to an embodiment.

Example II. Growth of Zeolite Membrane Sheets in Reactor with External Planar Heaters The design of a plate-type reactor vessel is shown in FIG. 11. The reactor vessel 610 has an external dimension of 280 mm width×300 mm height×40 mm thickness and internal dimensions of 260 mm width×300 mm height×20 mm thickness. The vessel may be made of 316 stainless steel or any other suitable material. Two planar heaters 1000 (FIG. 10) and one reactor vessel 610 (FIG. 11), which are all made of stainless steel 316, are assembled into a reactor apparatus 1200 as shown in FIG. 12. The planar heaters 1000 are attached to the two side walls 602 of the reactor vessel 610 without any air gap. The top cover plate 608 contains two ports 616 for insertion of thermocouple wells into the growth solution 104, one port 618 for a pressure gauge, one port for fluid transport 620, and one port 622 for a connection to a pressure relief valve and for introduction of purge gas. The bottom cover 612 contains one port 614 for fluid transport. The reactor apparatus 1200 is pressurized to 8 bar (absolute) and shows no leakage. The reactor apparatus 1200 is insulated in all six surfaces. In an embodiment, the top and bottom insulation materials are more readily removable for loading/unloading. The heating oil is supplied to the common thermal fluid inlet and outlet 103 and 105. The temperature inside the reactor 600 is controlled by the heating oil temperature.

The reactor 600 is used to grow NaA-type zeolite membranes on a flat support sheet. A porous metal sheet of 21 cm width×21 cm length is used as the membrane support. One surface of the support sheet is coated with zeolite seeding crystals. Eight of the seeded sheets are loaded into the growth reactor by aid of a support frame. The seeded surface is exposed to the growth solution 104, while the other surface is attached on the stainless steel support plate. In an embodiment, the seeded support sheets are positioned in the middle of the reactor 600. A growth solution 104 is prepared by mixing aluminum hydroxide, sodium silicate, and sodium hydroxide solutions homogeneously. The reactor vessel 600 is filled with the growth solution 104 to a level to assure that the membrane support sheet is fully immersed. After the top cover 608 is closed, the reactor 600 is heated up with hot oil according to a designated temperature profile. The growth zone 604 temperatures are monitored by two thermocouple wells 616 that are inserted into the left and right sides of the reactor vessel 610. Each thermocouple well 616 measures three temperatures at different heights of the growth solution 104, relative to the reactor bottom.

Figure 13:
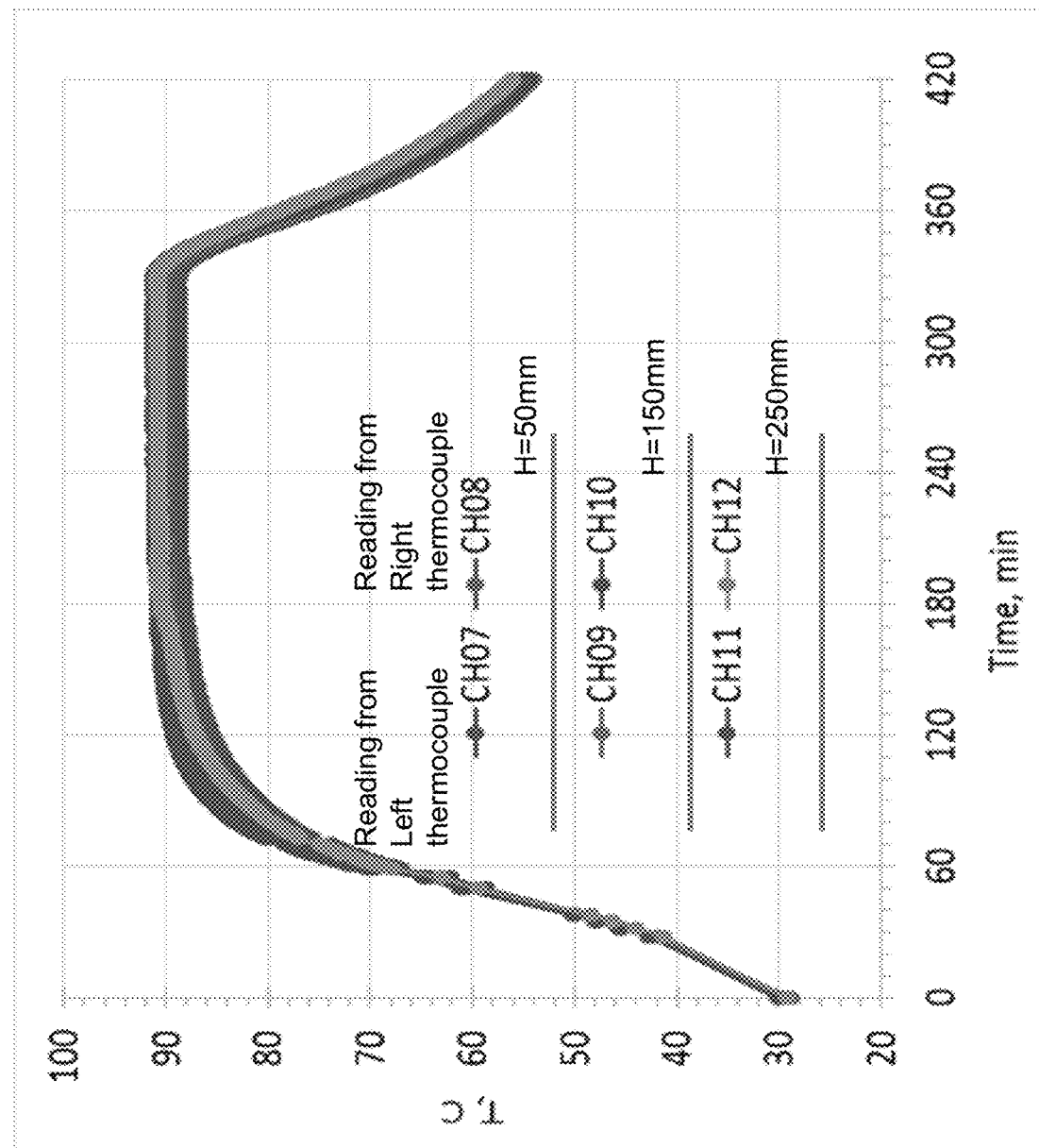
FIG. 13 is a plot of temperature as a function of time along the reactor height of a reactor according to an embodiment.
Figure 14B:
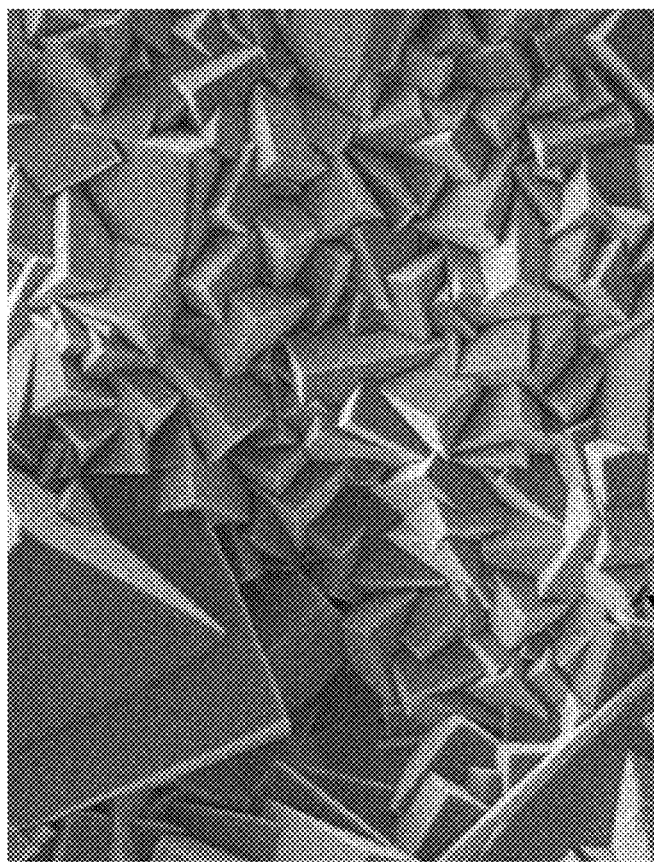
FIG. 14B is a scanning electron micrograph illustrating the crystal structure of the zeolite membrane of FIG. 14A.
Figure 14A:
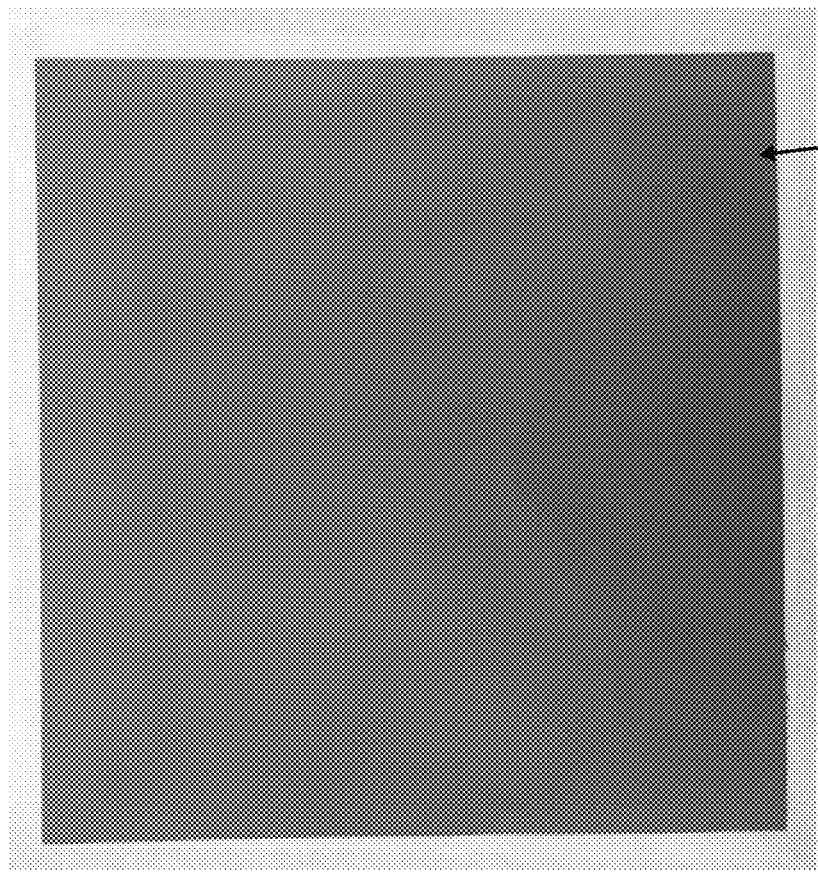
FIG. 14A is a photograph of a zeolite membrane sheet grown in a reactor with external planar heaters according to an embodiment.

FIG. 13 shows the temperature profiles of a complete membrane growth process, including ramping, holding, and cooling stages. The temperature readings at different heights on the right and left overlap in all the stages. The largest difference is no more than 5° C. After the growth is done, the spent growth solution is drained from the port 614 on the bottom cover. The top cover 608 is opened to take out the membrane sheets 702. The membrane sheets 702 are rinsed with tape water to remove loose deposits. The wet membrane sheets 702 are dried under ambient air conditions and weighed. FIG. 14A shows the surface appearance of a zeolite membrane sheet 1400. Compared to the metallic luster of the porous metal support sheet, the zeolite membrane shows dark color because of the different refractory index of the zeolite crystal. By contrast, the zeolite powder or coating of zeolite particles looks white in appearance. The crystal structure of the zeolite membrane 1400 is clearly revealed by SEM analysis. FIG. 14B shows the zeolite membrane 1400 (10,000× magnification) comprising densely inter-grown zeolite crystals 1402, indicating high crystal purity of the membrane 1400. No voids and/or cracks are seen. The zeolite membrane 1400 quality is assessed by dropping food color on different positions on the membrane sheet 1400. The food color molecule size is about 1-2 nm. Penetration of the color through the membrane indicates the presence of defects. Table 5 shows that all the eight membrane sheets 1400 from one batch of reactor loading have no color leakage. The growth weight gain of the eight sheets are in the range of 4.4 to 5.6 wt. %, which is within acceptable variance.

TABLE 5

Zeolite membrane sheets grown in one batch of plate-type reactor loading

| Sheet # | Color leakage | Weight gain % |
|---|---|---|
| 1 | No | 4.4 |
| 2 | No | 4.6 |
| 3 | No | 4.9 |
| 4 | No | 5.4 |
| 5 | No | 5.1 |
| 6 | No | 4.8 |
| 7 | No | 5.1 |
| 8 | No | 5.6 |

The growth reactor 1200 of present embodiment shows excellent reactor productivity. Only about 1.5 liter of growth solution is needed to grow 8 membrane sheets of about 3528 cm² total area.

Example III. Reactor of Internal Planar Heaters for Zeolite Membrane Growth

A planar heater 900 with slight variation from the above external heating may be fabricated as shown in FIG. 15. Five 4.7 mm OD×4.2 mm ID stainless steel tubes 1-5 are embedded on a 3 mm-thick 275 mm×475 mm stainless steel flat plate 7 with even spacing. The flat plate area corresponds to the isothermal growth area. One end of the heating tubes 1-5 are connected to a 6.4 mm OD×5.0 mm ID manifold stainless steel tube 6 for introduction of heating oil, while the other ends are connected to another manifold tube 6' for collection of the heating oil from the individual tubes 1-5 to a common outlet. The flatness of the planar heater 900 is checked by placing the planer heater 900 on a flat surface without any air gap. The planar heater 900 is pressurized by air to 8 bars and shows no leakage. Ten of these heaters 900 are installed inside a cylindrical reactor vessel 806 as shown in FIG. 8. The reactor vessel 806 is 421 mm OD×700 mm height×4.2 mm wall thickness, made of 316 stainless steel. Fillers 802 are placed inside the reactor vessel 806 to create a square-shaped growth zone 604 of 260 mm width×600 mm height. The filler 802 may be made of PTFE. The fillers 802 have 10 pairs of 6 mm wide×10 mm deep slots for insertion of the 10 planar heaters at 26 mm spacing. As a result, 9 heating zones 604 with characteristic heat transfer dimension of 26 mm are formed. The fillers 802 have 4×9=36 pairs of 2 mm wide×5 mm deep slots for insertion of membrane sheets 702. 4 pairs of the smaller slots are even spaced within each heating zone 604.

After the ten planar heaters 1000 are positioned inside the reactor 800, heating oil inlet 103 and outlets 105 are connected to the external pipelines through two pairs of ports 103, 105 on the wall 602 of the reactor vessel 610. On the top cover 608, two arrays of ports 616 are located for insertion of thermocouple wells to measure the whole region of the heating zone 604, one port 622 for pressure relief, one port 618 for a pressure gauge, and one port 620 for fluid transport. On the bottom cover 612, only one port (not shown) for fluid transport is provided.

Figure 16:
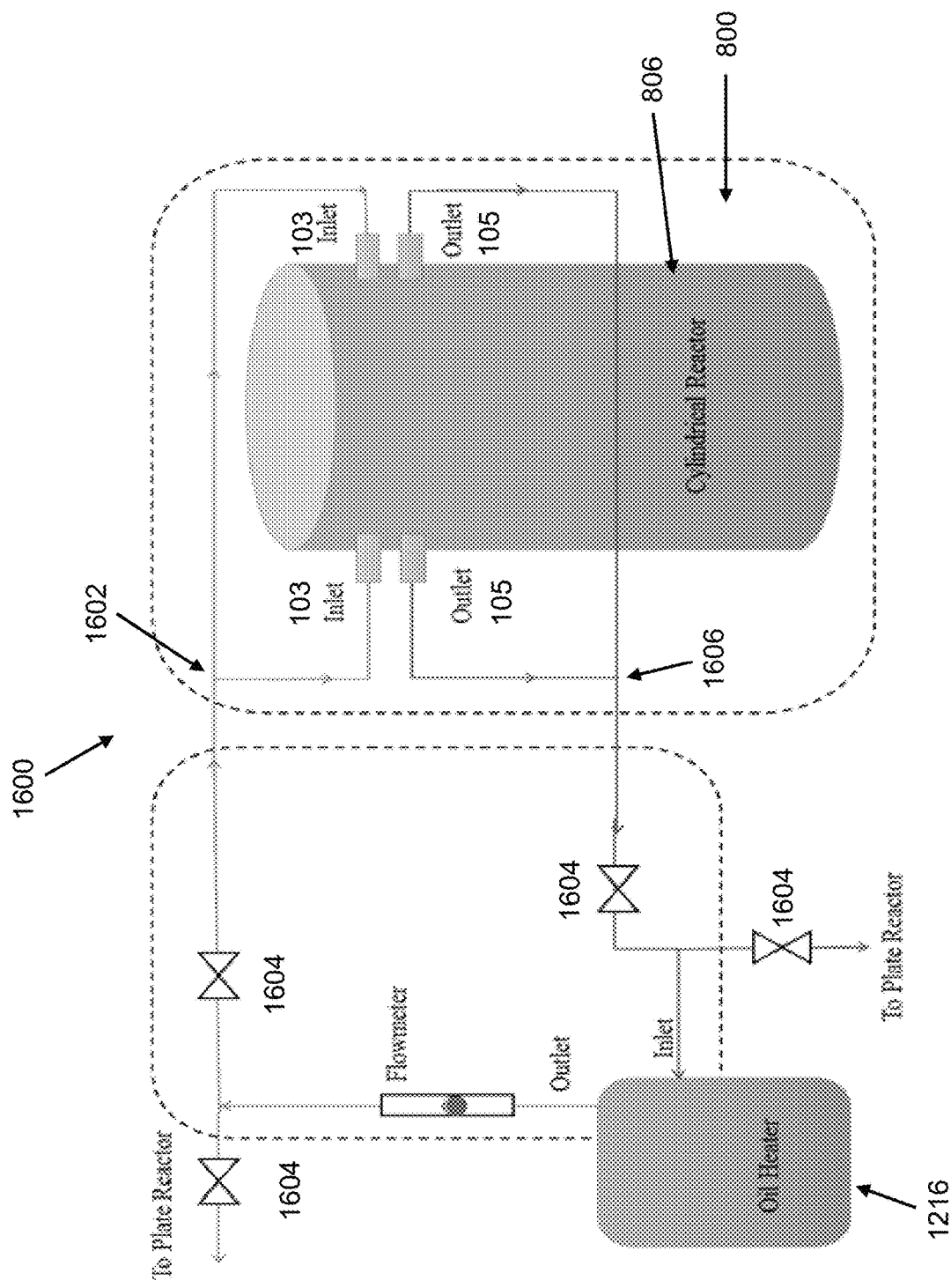
FIG. 16 is a schematic illustration of a growth apparatus with immersed planar thermal fluid heaters according to an embodiment.

The planar heaters 900 are connected to the heating oil fluid as shown in FIG. 16. Hot oil from the oil heater 1216 is split into two streams at splitter 1602 which enter the planar heaters 900 from two opposite sides of the reactor wall 806. The heating oil feed streams flow through the 10 planar heaters 900 in an alternated cross-flow manner to provide uniform heating. In each heating zone 604, the heating oil flows from right to left in one heater 900, while in the adjacent heater 900, the heating oil flows from left to right. Reactor heating is controlled by the heating oil flow rate and temperature. The reactor apparatus 1600 is first tested under pressure to check for leakage. The growth zone 604 is filled with de-ionized water and then, the reactor vessel 806 is pressurized with air to 8 bars. If the reactor pressure is unchanged within 30 min when all the inlet and outlet valves 1604 are closed, the reactor vessel 806 is determined without leakage.

The temperature distribution in the reactor is assessed by filling the growth zone 604 with de-ionized water and heating the growth zone 604 with hot oil. The temperatures in the growth zones 604 are measured using four thermocouple wells with their positions shown in FIG. 17A. TC #19 and 20 are fixed at the mid height of the reactor 806 in the outermost growth zone 604. TC #17 is located at the other outermost growth zone 604, opposite to TC #19 and #20, and is movable along the height. TC #18 is located at the middle growth zone 604 and movable along the height. When reactor heating reaches a steady state at a given heating oil temperature, TC #17 and #18 are used to measure the temperatures at different heights in the respective growth zones 604. The temperature distributions measured are shown in FIG. 17B with heating oil temperature at 95° C. The temperature distribution is uniform within the height range from 10 to 63 cm. The difference is less than 3° C. FIG. 17C shows the temperature distribution at a heating oil temperature of 107° C. The temperature is nearly uniform within a height of 10 to 63 cm. The temperature in the outer zone (#17) is about 3° C. lower than in the middle zone (#18) consistently. This is found to be due to insufficient insulation of the reactor vessel exterior. When the insulation is improved, the temperature difference is significantly reduced at a heating oil temperature of 117° C. (FIG. 17D). The testing results confirm that uniform temperature distribution in the growth zone 604 can be obtained with the present reactor design.

Growth of zeolite membranes 106 on a porous metal support sheet is performed in the reactor 900. The thin porous metal sheet is pre-coated with NaA-type seeding crystals on its front surface. The membrane support sheet is mounted on a 1 mm-thick stainless-steel substrate plate with the seeded surface exposed to the growth solution 104. The substrate plate is inserted into the growth zone 604. This reactor provides 9 growth zones 604, which are confined by the planar heaters 102. Each growth zone has full capacity to accommodate 4 substrate plates. In the actual run, each growth zones 604 may be loaded with 1, 2, 3, or 4 substrate plates. Each substrate can accommodate two 45 cm×24 cm membrane sheets. In this run, each substrate plate is attached with one or two membrane sheets 1400. Table 6 lists 30 membrane sheets 1400 attached to 26 substrate plates loaded into 9 growth zones 604.

Figure 18:
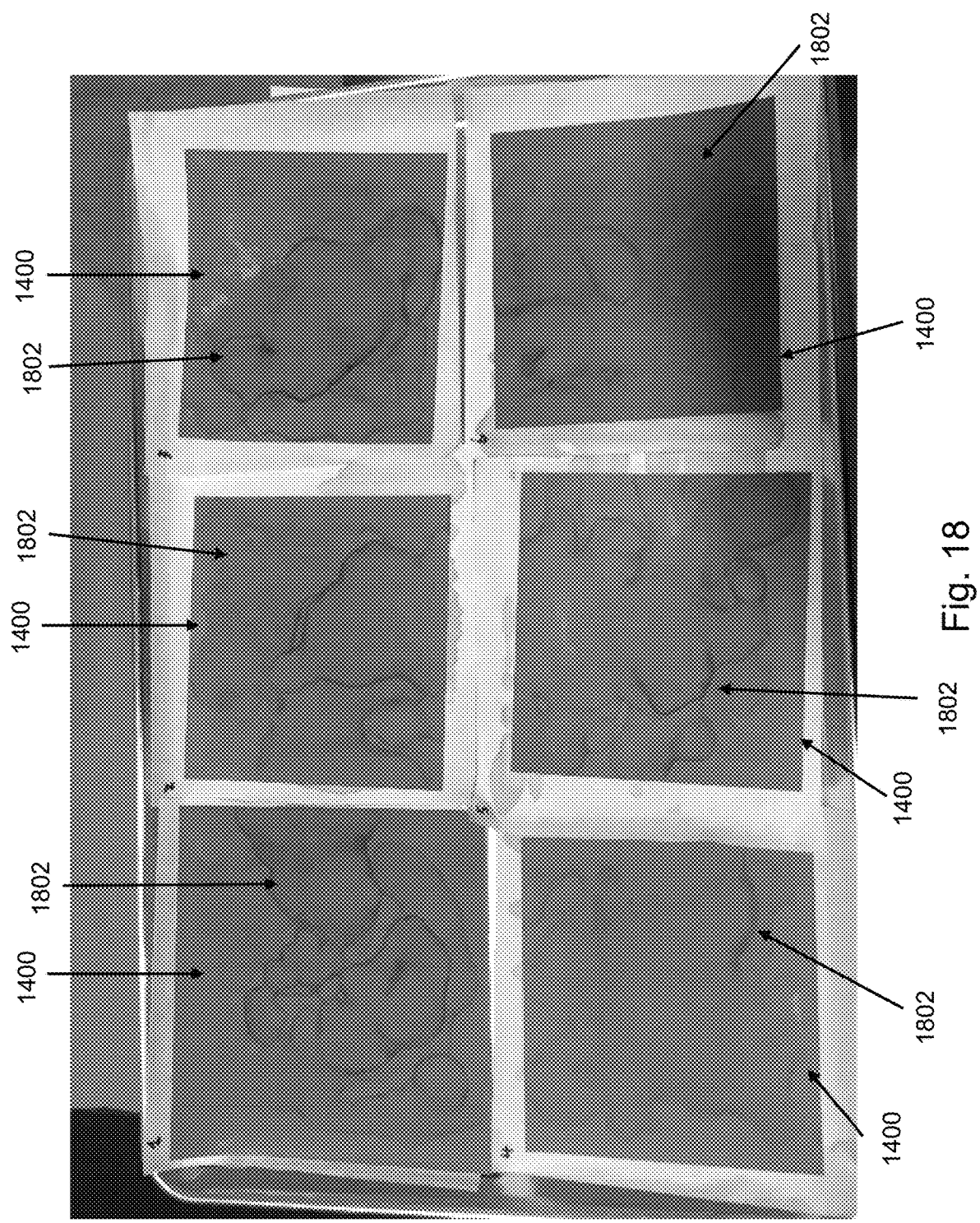
FIG. 18 is a photograph showing samples of zeolite membrane sheets grown in a reactor having internal planar heaters.

The growth solution 104 is prepared from the aluminum hydroxide, sodium silicate, and sodium hydroxide in the same way as used for the above plate-type reactor growth. 40 liters of the growth solution fills up the growth zone 604, which is almost 30 times of the amount required for one plate-type reactor 100, 600. The reactor is heated with the heating oil. The heating oil temperature is controlled at 1° C./min to 95° C. and 3.5 h hold at 95° C. It is found that due to the large thermal mass of this reactor 900, it takes about 5 hours for the temperatures to reach 85-90° C. in the growth zone 604. After the heating oil is turned off, it takes about 1 day for the reactor 900 to cool down naturally. Then, the spent solution is drained from the bottom port 612 and the membrane sheets 1400 are taken out of the reactor from the top. The membrane sheets 1400 are rinsed with tap water and dried under room conditions. The membrane sheets 1400 are weighed to obtain the growth weight gain listed in Table 6. All the membrane sheets 1400 gain a few percentage weight. The membrane sheets 1400 look the same as the ones grown in the plate-type reactor 100, 600. FIG. 18 shows 6 representative membrane sheets 1400. The blue food color 1802 is retained by all the membrane sheets, indicating the absence of voids or holes on the membrane sheet 1400.

This example demonstrates the working principles of the growth reactor 806 having internal planar heaters 102b for growth of membrane sheets 1400. The reactor loading configuration and operating conditions can be optimized according to specific growth needs. For example, high reactor productivity can be achieved in the following ways: i) substrate plates and membrane sheets are loaded in full capacity; ii) the heating oil flow rate is raised to increase the growth reactor heating rate; iii) the cold oil is pumped into the heaters to increase the reactor cooling rate.

TABLE 6

Zeolite membrane sheets grown in the reactor with internal planar heaters

| Sheet# | #1 | #2 | #3 | #4 | #5 | #6 | #7 | #8 | #9 |
|---|---|---|---|---|---|---|---|---|---|
| Zone-plate #[a] | 1-1 | 1-1 | 1-2 | 2-1 | 2-2 | 2-3 | 2-4 | 3-1 | 3-2 |
| Sheet width, cm | 21.0 | 17.8 | 17.8 | 17.8 | 17.8 | 17.8 | 17.8 | 17.0 | 17.8 |
| Sheet length, cm | 21.0 | 17.8 | 17.8 | 17.8 | 17.8 | 17.8 | 17.8 | 17.0 | 17.8 |
| Sheet area, cm$^2$ | 441.0 | 316.1 | 316.1 | 316.1 | 316.1 | 316.1 | 324 | 289.0 | 316.1 |
| Sheet thickness, μm | 50 | 46 | 50 | 45 | 49 | 45 | 45 | 46 | 48 |
| Gain Wt. % | 3.9% | 4.1% | 3.6% | 3.7% | 3.2% | 3.7% | 3.6% | 5.1% | 4.2% |

| Sheet# | #10 | #11 | #12 | #13 | #14 | #15 | #16 | #17 | #18 | #19 | #20 | #21 |
|---|---|---|---|---|---|---|---|---|---|---|---|---|
| Zone-plate #[a] | 4-1 | 4-2 | 4-3 | 5-1 | 5-2-a | 5-2-b | 5-3 | 5-4 a | 5-4-b | 6-1 | 6-2 | 6-3 |
| Sheet width, cm | 17.8 | 17.0 | 15.2 | 17.8 | 17.8 | 17.8 | 17.8 | 15.2 | 15.2 | 14.0 | 14.0 | 15.2 |
| Sheet length, cm | 17.8 | 17.0 | 15.2 | 17.8 | 17.8 | 17.8 | 17.8 | 15.2 | 15.2 | 14.0 | 14.0 | 15.2 |
| Sheet area, cm$^2$ | 316.1 | 289.0 | 232.3 | 316.1 | 316.1 | 316.1 | 316.1 | 232.3 | 232.3 | 196.0 | 196.0 | 232.3 |
| Sheet thickness, μm | 45 | N/A | N/A | N/A | N/A | 48 | 48 | 48 | 46 | 46 | 48 | 49 |
| Gain Wt. % | 4.5% | 3.3% | 4.7% | 3.2% | 3.2% | 3.7% | 1.9% | 1.8% | 3.7% | 2.7% | 2.6% | 3.0% |

| Sheet# | #22 | #23 | #24 | #25 | #26 | #27 | #28 | #29 | #30 |
|---|---|---|---|---|---|---|---|---|---|
| Zone-plate #[a] | 7-1 | 7-2 | 8-1 | 8-2 | 8-3 | 8-4 | 9-1 | 9-2 | 9-2 |
| Sheet width, cm | 17.8 | 17.8 | 17.8 | 19.1 | 19.1 | 19.1 | 16.5 | 16.5 | 16.5 |
| Sheet length, cm | 17.8 | 17.8 | 17.8 | 19.1 | 19.1 | 19.1 | 16.5 | 16.5 | 16.5 |
| Sheet area, cm$^2$ | 316.1 | 316.1 | 316.1 | 362.9 | 362.9 | 362.9 | 272.6 | 272.6 | 272.6 |
| Sheet thickness, μm | 48 | 46 | 47 | 41 | 41 | 46 | 49 | 48 | 47 |
| Gain Wt. % | 3.7% | 4.4% | 4.3% | 3.7% | 4.4% | 4.7% | 4.3% | 4.1% | 3.8% |

[a]The first number represents the growth zone and second number stands for the membrane support plate inside that growth zone.

Although the foregoing refers to particular preferred embodiments, it will be understood that the invention is not so limited. It will occur to those of ordinary skill in the art that various modifications may be made to the disclosed embodiments and that such modifications are intended to be within the scope of the invention. All of the publications, patent applications and patents cited herein are incorporated herein by reference in their entirety.

I claim:

1. A method of making a porous structured material comprising:
   providing a hydrothermal growth reactor comprising:
   a reactor vessel for containment of a precursor and a structured material, the reactor vessel comprising at least two planar heaters configured with even spacing having an aperture in the range of 3 mm to 10 cm and for uniform heating at a controllable rate of the precursor and the structured material, wherein a width and a length of the planar heater is at least three times the spacing; and
   at least one removable cover configured to transport the structured material into and out of the reactor vessel;
   providing a growth solution comprising the precursor to the aperture; and
   synthesizing the porous structured material by heating the growth solution in the hydrothermal growth reactor, wherein the hydrothermal growth reactor is at a temperature less than 300° C.

2. The method of claim 1, further comprising maintaining a temperature difference of a plurality of growth zones in the hydrothermal growth reactor, wherein the temperature difference between each of the plurality of growth zones is less than 20° C.

3. The method of claim 1, further comprising heating the growth solution at a heating rate less than 2° C./min.

4. The method of claim 3, further comprising heating the growth solution at a heating rate less than 1° C./min.

5. The method of claim 1, wherein providing a growth solution comprises providing an aqueous growth solution containing Al compounds and Si compounds capable of being converted into a micro-porous zeolite material when heated.

6. The method of claim 1, further comprising heating the hydrothermal growth reactor in a temperature range of 20-300° C. and a pressure range of 1-30 bar.

7. The method of claim 1, the reactor vessel is heated by providing heated oil to flow channels located in the reactor vessel.

8. The method of claim 7, wherein the heated oil is providing via a manifold.

9. The method of claim 1, further comprising maintaining a uniform temperature distribution over surface of the planar heat as measured by a standard deviation of less than 20° C.

10. The method of claim 9, wherein the standard deviation is less than 10° C.

\* \* \* \* \*